United States Patent
Uekawa et al.

(10) Patent No.: US 6,683,733 B2
(45) Date of Patent: Jan. 27, 2004

(54) OPTICAL MEMBER WITH HANDLING PORTION AND METHOD FOR MANUFACTURING OPTICAL MEMBER AND METHOD FOR MOUNTING OPTICAL MEMBER AND OPTICAL MODULE

(75) Inventors: Masahiro Uekawa, Kanagawa (JP); Kyoko Kotani, Tokyo (JP); Hironori Sasaki, Yamanashi (JP); Takeshi Takamori, Tokyo (JP); Yoshinori Maeno, Tokyo (JP)

(73) Assignee: OKI Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 10/136,326

(22) Filed: May 2, 2002

(65) Prior Publication Data

US 2002/0163740 A1 Nov. 7, 2002

(30) Foreign Application Priority Data

May 2, 2001 (JP) .................................. 2001-134939
Nov. 1, 2001 (JP) .................................. 2001-336256
Nov. 14, 2001 (JP) .................................. 2001-348253

(51) Int. Cl.$^7$ ............................................. G02B 7/02
(52) U.S. Cl. ............................................. 359/819
(58) Field of Search ................................. 359/819, 811, 359/821, 808; 385/88, 92, 97

(56) References Cited

U.S. PATENT DOCUMENTS 4,059,345 A * 11/1977 Kawamura et al. ......... 359/819
4,147,403 A * 4/1979 d'Auria et al. ............... 385/77
6,456,766 B1 * 9/2002 Shaw et al. .................. 385/47

FOREIGN PATENT DOCUMENTS

JP    7-199006    8/1995    ............ G02B/6/42
JP    11-295561   10/1999   ............ G02B/6/42

OTHER PUBLICATIONS

Kazuhiro Tanaka et al., "High Optical Coupling Scheme in LD Modules with Silicon Platform Technology", IEICE Trance, Electron, vol. E80–C, No. 1, Jan. 1997 pp. 107–110.

Hongtao Han et al., "Integration of silicon bench micro-optics", Proc. SPIE, vol. 3631, pp. 234–243., Apr. 1999.

* cited by examiner

Primary Examiner—Ricky Mack
(74) Attorney, Agent, or Firm—Wenderoth, Lind & Ponack, L.L.P.

(57) ABSTRACT

A lens element 1 is formed by making use of an optical substrate, and includes a lens portion 2, an edge portion 6 in the form of a circular arc provided along the circumference of the lens portion 2, and a handling portion 4 which is integrated with the lens portion 2 and the edge portion 6 as well and extends with a width wider than that of the lens portion 2. The handling portion 4 can be caught and held by using a grasping means, a vacuum sucking means and so forth. With this, the lens element 1 can be handled by catching the handling portion 4 without directly touching the lens element 1, thus the lens element 1 being neither damaged nor contaminated, and being stably handled with ease.

19 Claims, 15 Drawing Sheets

FIG.20(A)
FIG.20(B)
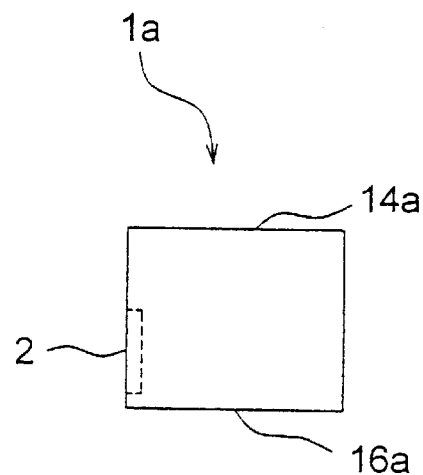
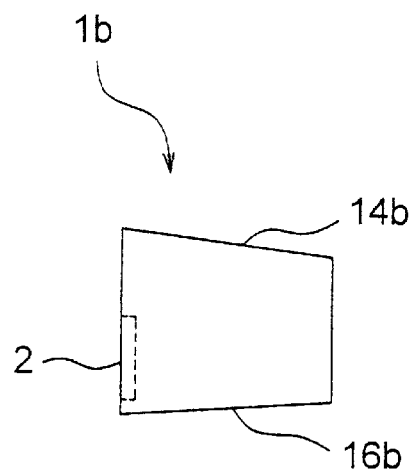
FIG.21(A)
FIG.21(B)
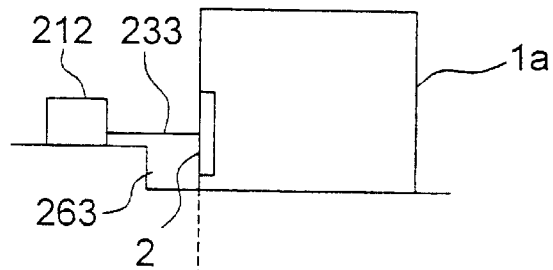
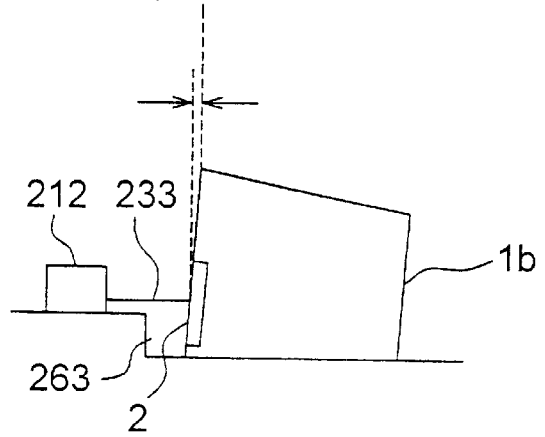

OPTICAL MEMBER WITH HANDLING PORTION AND METHOD FOR MANUFACTURING OPTICAL MEMBER AND METHOD FOR MOUNTING OPTICAL MEMBER AND OPTICAL MODULE

BACKGROUND OF THE INVENTION

1. Field of the Invention

The present invention relates to an optical member such as a lens element preferably applicable to an optical communication devices, tools, and systems and more particularly, to an optical member such as a micro-lens suitable for constituting things by mean of a microscopic optical element of the diffraction type such as a Computer Generated Holographic (CGH) optical element. The invention also relates to a method for manufacturing the optical member as described above, an optical module, and a method for mounting the optical member as mentioned above.

2. Prior Art

With regard to the optical member coupled to a laser diode and an optical fiber in the field of the optical communication, the Japanese patent publication No. 7-199006 and the ditto No. 11-295561 have already disclosed it publicly. The former proposes an optical coupling by means of a ball lens in the form of a sphere while the latter describes a circular lens provided with an annular portion formed along the external edge of the lens.

There has been also devised and reported an optical member like a lens which are manufactured by using the photo-lithography and etching technique and used in the above field. In this example, a lens or the like having a desired shape is formed on the silicon substrate by using the photolithographic process.

Being formed in this way, the lenses are often treated in the thin film formation process to be coated with a tin film, an anti-reflection film, a filtration film and so forth, for instance.

These lenses are arranged and mounted in their respective predetermined positions on a semiconductor substrate, on which a laser diode, an optical fiber, and other elements are mounted, such that the respective optical axes of them meets those of corresponding elements. At the time of mounting, these lenses are arranged on the corresponding grooves formed on the semiconductor substrate, thereby being appropriately positioned to be coupled to the laser diode, the optical fiber and other corresponding elements.

SUMMARY OF THE INVENTION

However, the diameter of the conventional micro-lens like the ball lens or the lens provided with the annular portion as describe above, is no more than 100 μm through 200 μm. Consequently, it would never be easy to handle and correctly arrange such a minute micro-lens in a predetermined position.

Then, even if trying to handle and hold the minute micro-lens by making use of the negative pressure, the micro-lens provided with the annular portion has a circular curved surface along the circumference thereof, so that it would not properly work to suck in and hold such lens by utilizing the negative pressure from the side portion of the lens.

Similarly, in case of the lens as produced in the above process utilizing the photolithographic etching, the lens size becomes also very small. In this manufacturing process, a lot of lens elements are formed in usual on a single silicon substrate, and at the stage where the lens element formation is completed, lens elements are split into a lot of individual lens elements. Consequently, it would become so difficult to collect and handle them one by one.

Furthermore, in the thin film formation process for forming an anti-reflection film and so on, a large number of individual lenses have to be drawn up in a predetermined form such that their respective surfaces to be coated with the thin film are kept at a same level, and then, to be moved to the vapor deposition process. This is also neither easy nor efficient.

Similarly, in case of the process of mounting the individual lens elements, it would also be not easy to handle and arrange such minute lens elements in the corresponding predetermined positions, respectively.

Heretofore, when mounting the lens element like this on the supporting substrate, there has been often taken such a way that the positioning of each element is carried out by using the upper side of the lens formation plane as a reference point, and the mounting is then executed by bringing the side face of the lens formation plane into contact with the supporting substrate. However, this way sometimes causes a mounting error depending on the external form of the lens element. For instance, if the angle made by the lens formation plane and the said face thereof includes a certain error, there is caused a distance error related to the slant of the lens element. This distance error becomes a significant cause which reduces the efficiency of the optical coupling between the lens element and the laser diode, optical fiber, and so forth.

Then, the invention has been made for obviating such problems as described above. Accordingly, it is an object of the invention to provide an optical member which can be handled with ease, a method for manufacturing the same, and an optical module including the same. Furthermore, another object of the invention is to provide an optical member which can be sucked in and held with ease by utilizing negative pressure. Still further, another object of the invention is to provide an optical member which can be mounted with high accuracy and ease, a method for mounting the same, and an optical module packaged with high accuracy and ease.

In order to solve problems as described above, according to the invention, there is provided an optical member including a luminous flux conversion portion formed on the surface of an optical substrate; an edge portion formed along a part of the circumference of the luminous flux conversion portion; and a handling portion which is provided on the side of the other part of the circumference of the luminous flux conversion portion in a plane approximately in parallel with the surface of the luminous flux conversion portion, and is extended with a width wider than the luminous flux portion.

In the above optical member as described above, the optical member includes an optical element, an optical element aggregation, an optical element aggregation group and so forth; to put it more concrete, a lens element, a lens element aggregation, a lens element aggregation group, lens array and so forth.

In the above optical member as described above, this specification and scope of claims for patent as attached thereto, the luminous conversion portion means those which have the function of converting the luminous flux, for instance, the function of converging, diverging, reflecting, deflecting the luminous flux or the like. Also, depending on the arrangement condition of it, the luminous conversion portion includes those which convert the incident luminous flux into parallel light rays, or divide the incident luminous flux into a plurality of component waves. The lens, diffraction optical element, and forth are concrete examples of the luminous flux conversion portion.

The optical substrate may be formed by means of a crystalline substrate such as a silicon crystal substrate. Besides, the crystalline substrate may be formed by using other materials than silicon, for instance, GaAs, InP, GaP, SiC, Ge and so forth.

According to the constitution of the optical member as described above, the handling portion can be held by means of a griping means or a suction means utilizing the negative pressure. With this, when handling the optical member, it becomes possible to hold the optical member by the handling portion thereof. Comparing with the prior art, therefore, the optical member can be much easily handled neither giving any damage to the luminous conversion portion nor contaminating the surface of the same.

At that time, the above handling portion may be constituted such that it has a form extending straightforward and is integrated with the edge portion at an approximately middle point between both ends thereof. The handling portion may take the form of an approximately rectangular parallelepiped, the edge portion may take the form of an approximately circular arc, and the circular arc form may extend from the formation plane side of the luminous flux conversion portion to the opposite plane side thereof, thereby forming a projection portion of the semi-cylindrical type.

It is preferable for the handling portion to have a flat plane. With this flat plane, the handling portion can be easily sucked in and held with ease by means of the suction means. At that time, the handling portion may be constituted such that it has a form extending straightforward and at the same time while the flat plane is a plane existing along the direction toward which the handling portion extends, and is approximately vertical to the surface of the luminous flux conversion portion.

It is preferable that the handling portion is asymmetrically formed with respect to a virtual plane which includes the optical axis of the luminous flux conversion portion and goes across the handling portion, in order to identify either one of both surfaces of the optical substrate, or that the handling portion includes a guide mark for identifying either one of both surfaces of the optical substrate.

If the luminous flux conversion portion is formed on either one face of the optical substrate, by making the handling portion asymmetric or by putting the guide mark on the handling portion, it is discriminated with ease on which one face the luminous flux is. On one hand, even if luminous flux conversion portions having different optical characteristics are respectively formed on the both faces of the optical substrate, it is also discriminated with ease which luminous flux conversion portion is on which face.

The optical member is an optical member to be mounted on a supporting substrate and is preferably with a positioning mark formed on the plane which is approximately vertical to the surface of the luminous flux conversion portion in the handling portion and approaches the supporting substrate at the time of mounting the optical member.

According to such a constitution as described above, as the positioning of the optical element can be carried out by using the positioning mark, the optical element can be packaged with high accuracy and with ease as well, irrespective of the external form thereof.

At that time, the positioning mark may take the form of a groove, of which the cross section has one of the shapes of an approximately V-shape, an approximately trapezoid shape, an approximately semicircular shape, an approximately rectangle shape, and an approximately square shape.

It is preferable that the positioning mark is asymmetrically formed with respect to a virtual plane which includes the optical axis of the luminous flux conversion portion and goes across the handling portion, in order to identify either one of both surfaces of the optical substrate. According to the constitution like this, if the luminous flux conversion portion is formed on either one face of the optical substrate, by making the handling portion asymmetric, it is discriminated with ease with the help of the mark on which one face the luminous flux is. On one hand, even if luminous flux conversion portions having different optical characteristics are respectively formed on the both faces of the optical substrate, it is discriminated also with ease which luminous flux conversion portion is on which face.

The optical member is an optical member which is arranged on a groove portion as formed on the supporting substrate for use in arrangement of optical members, such that it opposes to the end face of an optical fiber placed on the groove portion and achieves an optical coupling to the optical fiber. The edge portion has a circular arc form, which extends from the luminous flux conversion portion formation plane side to the opposite plane side thereof, and the outer diameter of the circular arc shape is preferably made equal to that of the optical fiber. According to the constitution like this, the both optical axes of the optical fiber arranged on the groove portion for use in the member arrangement and the optical member can be coincided with each other relatively with high accuracy and with ease as well.

According to the other aspect of the invention, there is provided an optical member including a plurality of luminous flux conversion portions formed on the surface of an optical substrate; edge portions formed along a part of respective circumferences of a plurality of the luminous flux conversion portions; and a handling/supporting portion which is provided on the side of the other part of respective circumferences of a plurality of the luminous flux conversion portions and is extended in a plane approximately in parallel with the surface of the luminous flux conversion portions, and connects and supports a plurality of the luminous flux conversion portions together.

At that time, a plurality of luminous conversion portions as described above may take the form of an array and the handling/supporting may be constituted such that it takes the form extending along the direction toward which the array extends.

According to another aspect of the invention, there is provided an optical member manufactured by a manufacturing method including:

the first step of forming a plurality of luminous flux conversion portions in the form of an array on an optical substrate; and the second step of forming an edge portion along a part of the circumference of each of the luminous flux conversion portions, and a handling/supporting portion which is provided on the side of the other part of the circumference of each of the luminous flux conversion portions and is extended to connect and support at least two of the luminous flux conversion portions together along the array of the luminous flux conversion portions, whereby there is obtained an optical element aggregation provided with a plurality of the luminous flux conversion portions, edge portions corresponding to a plurality of the luminous flux conversion portions, and the handling/supporting portion connecting and supporting these together, the optical member including:

at least one of the luminous flux conversion portions;

an edge portion formed along a part of the luminous flux conversion portion; and a handling/supporting portion connecting and supporting these together.

According to another aspect of the invention, there is provided an optical member manufactured by a manufacturing method including:

the first step of forming a plurality of luminous flux conversion portions in the form of an array on an optical substrate;

the second step of forming an edge portion along a part of the circumference of each of the luminous flux conversion portions, and a handling/supporting portion which is provided on the side of the other part of the circumference of each of the luminous flux conversion portions and is extended to connect and support at least two of the luminous flux conversion portions together along the array of the luminous flux conversion portions, whereby there is obtained an optical element aggregation provided with a plurality of the luminous flux conversion portions, edge portions corresponding to a plurality of the luminous flux conversion portions, and the handling/supporting portion connecting and supporting these together; and the third step of cutting the handling/supporting portion at a predetermined portion, thereby producing a plurality of individually separated optical elements of which each includes at least one of the luminous flux conversion portions, the optical member including:

at least one of the luminous flux conversion portions;

an edge portion formed along a part of the luminous flux conversion portion; and a handling portion which is formed by cutting the handling/supporting portion and is extended on the side of the other part of the circumstance of the luminous flux conversion portion.

According to another aspect of the invention, an optical member manufactured by a manufacturing method including:

the first step of forming a plurality of luminous flux conversion portions in the form of an array on an optical substrate;

the second step of forming an edge portion along a part of the circumference of each luminous flux conversion portions, a handling/supporting portion which is provided on the side of the other part of the circumference of each of the luminous flux conversion portions and is extended to connect and support at least two luminous flux conversion portions together along the array of the luminous conversion portions, and a nick in at least one predetermined position corresponding to the interval between two of the luminous flux conversion portions in the handling/supporting portion, whereby there is obtained an optical element aggregation provided with a plurality of the luminous flux conversion portions, edge portions corresponding to a plurality of the luminous flux conversion portions, and the handling/supporting portion connecting and supporting these together; and the third step of cutting the handling/supporting portion at a nick position, thereby producing a plurality of individually separated optical elements of which each includes at least one of the luminous flux conversion portions, the optical member including:

at least one of the luminous flux conversion portions;

an edge portion formed along a part of the luminous flux conversion portion; and a handling portion which is formed by cutting the handling/supporting portion and is extended on the side of the other part of the circumstance of the luminous flux conversion portion, the handling portion having a part of the nick and a cut face on the side face thereof.

In all the optical members as described above, the optical substrate may be a silicon crystalline substrate, the luminous flux conversion portion may be made up of diffractive optical elements, and the luminous flux conversion portion may be a lens.

According to another aspect of the invention, there is provided a method for manufacturing an optical member including the first step of forming a plurality of luminous flux conversion portions in the form of an array on an optical substrate; and the second step of forming an edge portion along a part of the circumference of each of the luminous flux conversion portions, and a handling/supporting portion which is provided on the side of the other part of the circumference of each of the luminous flux conversion portions and is extended to connect and support at least two of the luminous flux conversion portions together along the array of the luminous flux conversion portions, whereby there is obtained an optical element aggregation provided with a plurality of the luminous flux conversion portions, edge portions corresponding to a plurality of the luminous flux conversion portions, and the handling/supporting portion connecting and supporting these together.

According to the constitution like this, a plurality of luminous flux conversion portions can be integrated into one body by connecting and supporting them by the handling/supporting portion, thus enabling them to be handled in a lump. With this, the optical member can be collected and handled with ease and also, it can be easily moved to the thin film formation process for forming coating films, for instance an anti-reflection film, a filter film, and so forth.

According to another aspect of the invention, there is provided a method for manufacturing an optical member including the first step of forming a plurality of luminous flux conversion portions in the form of an array on the surface of an upper silicon layer surface of a optical substrate made up of a lower silicon layer, an upper silicon layer and a middle layer intervening therebetween; the second step of forming a edge portion along a part of the circumference of each of the luminous flux conversion portions by etching the upper silicon layer and at the same time, forming a handling/supporting portion by etching the upper silicon layer, the handling/supporting portion being provided on the side of other part of the circumference of each of the luminous flux conversion portions and extended to connect and support at least two of the luminous flux conversion portions together along the array of the luminous flux conversion portions, thereby obtaining an optical element aggregation provide with a plurality of the luminous flux conversion portions, edge portions corresponding to the luminous flux conversion portions, and the handling/supporting portion for connecting and supporting these altogether; and the third step of removing the middle layer, thereby separating the lower silicon layer from the optical element aggregation as obtained by the second step.

According to the constitution like this, a plurality of luminous flux conversion portions can be integrated into one body by connecting and supporting them by the handling/supporting portion, thus enabling them to be handled in a lump. With this, the optical member can be collected and handled with ease and also, it can be easily moved to the thin film formation process for forming coating films, for instance an anti-reflection film, a filter film, and so forth. Furthermore, when etching the silicon layer, for instance, the photolithographic etching method as used in the semiconductor manufacturing technique can be adopted and a lot of optical members can be formed in a lump with high accuracy.

In the method for manufacturing the optical member as described above, it may be possible to two-dimensionally arrange a plurality of luminous flux conversion portions in a plane approximately in parallel with the surface of the luminous flux conversion portions in the first step, and in the second step, to form a plurality of optical element aggregations and at the same time, a connecting portion for connecting at least each one side end of the handling/supporting portions of a plurality of the above optical element aggregations with one another, thereby obtaining an optical element aggregation group. Or again, it may be possible to two-dimensionally arrange a plurality of luminous flux conversion portions in a plane approximately in parallel with the surface of the luminous flux conversion portions in the first step, and in the second step, to form a plurality of optical element aggregations and at the same time, a connecting portion for connecting both ends of the handling/supporting portions of a plurality of the above optical element aggregations with one another, thereby obtaining an optical element aggregation group.

According to the constitution as described above, a plurality of luminous flux conversion portions are two-dimensionally arranged and an optical element aggregation group consisting of a plurality of optical element aggregations connected with each other is formed, so that these plural optical element aggregations can be handled in a lump, thus handling of them being made much easier.

The above method for manufacturing the optical member may be further provided with a step of forming a frame in at least a part of the circumferential edge portion of the optical substrate, the frame being connected with the optical element aggregation group through the connecting portion. According the constitution like this, the optical element aggregation group is firmly supported by the frame associated therewith, so that it becomes possible to handle it by means of a suitable automatic machine.

The above method for manufacturing the optical member may be further provided with a step of cutting the handling/supporting portion at a predetermined position, thereby producing individually separated optical elements of which each has at least one luminous flux conversion portion. According to the constitution like this, the individually separated optical elements can be produced from the optical element aggregation or the optical element aggregation group by a desired number of them.

The above second step may further include the steps of providing a nick in at least one predetermined position corresponding to the interval between the luminous flux conversion portions in the handling/supporting portion at the time of forming the handling/supporting portion in the second step and cutting the handling/supporting portion at the position of the nick, thereby producing individually separated optical elements of which each has at least one luminous flux conversion portion. According to the constitution like this, the work for separating the optical element aggregation or the optical element aggregation group into individually separated ones is facilitated.

According to another aspect of the invention, there is provided a method for mounting an optical member having a luminous flux conversion portion on a supporting substrate, including the steps of forming the first mark for positioning on the plane of the optical member which is approximately vertical to the surface of the luminous flux conversion portion and approaches the supporting substrate at the time of mounting the optical member; and forming the second mark for positioning on the supporting substrate, whereby the optical member is suitably mounted on the supporting substrate with the help of the first mark of the optical member and the second mark on the supporting substrate as well.

According to the constitution like this, the optical member can be mounted with high accuracy and ease as well by using the first positioning mark for the optical member and the second positioning mark for a position on the supporting substrate as reference marks. At this time, the first positioning mark for the optical member may take the form of a groove while the second positioning mark for a position on the supporting substrate may take the form of a recess portion.

In the above method, the optical member may include a luminous flux conversion portion formed on the surface of an optical substrate, an edge portion formed along a part of the circumference of the luminous flux conversion portion, and a handling portion which is provided on the side of the other part of the circumference of the luminous flux conversion portion in a plane approximately in parallel with the surface of the luminous flux conversion portion, and is extended with a width wider than the luminous flux portion, wherein the above positioning groove may be provided on the handling portion.

According to another aspect, there is provided a module including a supporting substrate on the surface of which a groove portion for use in arranging members thereon is formed; an optical fiber arranged on the groove portion; and an optical member arranged on said groove portion such that it opposes to the end face of the optical fiber and achieves an optical coupling thereto, wherein the optical member including a luminous flux conversion portion formed on the surface of an optical substrate; an edge portion formed along a part of the circumference of the luminous flux conversion portion; and a handling portion which is provided on the side of the other part of the circumference of the luminous flux conversion portion in a plane approximately in parallel with the surface of the luminous flux conversion portion, and is extended with a width wider than the luminous flux portion.

At that time, the edge portion may have a circular arc form, which extends from the luminous flux conversion portion formation plane side to the opposite plane side thereof, and the outer diameter of the circular arc shape may be made equal to that of the optical fiber.

In the module as described above, the supporting substrate is further provided with a positioning mark, the optical member is further provided with a positioning groove as formed in a plane which is approximately vertical to the surface of the luminous flux conversion portion in the handling portion and approaches the supporting substrate at the time of mounting optical members, and the optical member is arranged in part on the groove portion formed on the supporting substrate with the help of the positioning groove of the optical member and the positioning mark on the supporting substrate.

According to the constitution like this, the optical member is arranged in part on the groove portion by carrying out the positioning using the groove of the optical member and the mark on the supporting substrate, so that a module packaged with high accuracy can be provided.

At that time, the above mark may be a recess portion which intersects the groove portion at right angles.

According to another aspect of the invention, there is provided a module including a supporting substrate on the surface of which a plurality of groove portions for use in arranging members thereon is formed; a plurality of optical fibers arranged on each of the groove portion; and optical members arranged on each of said groove portions such that each of them opposes to each end face of each of the optical fibers and achieves an optical coupling thereto, wherein the optical member includes a plurality of luminous flux conversion portions formed on the surface of an optical substrate; edge portions formed along a part of respective circumference of the luminous flux conversion portion; and a handling/supporting portion which is provided on the side of the other part of respective circumference of a plurality of the luminous flux conversion portions in a plane approximately in parallel with the surface of the luminous flux conversion portion, and is extended to connect and support a plurality of the luminous flux conversion portions together.

At that time, each end face of a plurality of the optical fibers may be arranged to oppose to each of a plurality of luminous flux conversion portions of the optical member, and each of the edge portions may have a circular arc form, which extends from the luminous flux conversion portion formation plane side to the opposite plane side thereof, and the outer diameter of the circular arc shape may be made equal to that of each of the optical fibers opposing to each of the luminous flux conversion portions corresponding to each of the edge portion.

In the module as described above, the supporting substrate may be further provided with a positioning mark, the optical member may be further provided with a positioning groove as formed in a plane which is approximately vertical to the surface of the luminous flux conversion portion in the handling/supporting portion and approaches the supporting substrate at the time of mounting optical members, and the optical member is arranged in part on the groove portion formed on the supporting substrate with the help of the positioning groove of the optical member and the positioning mark on the supporting substrate.

At that time, the above mark may be a recess portion which intersects the groove portion at right angles.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments. In the drawings:

FIGS. 3A through 3C are diagrams showing the constitution of a lens element according to the third embodiment of the invention, wherein FIG. 3A is a perspective view of the lens element, FIG. 3B a bottom view of the same, and FIG. 3C a side view of the same;

FIGS. 13A and 13B are diagrams for explaining a method for manufacturing a lens element according to the ninth embodiment of the invention, wherein FIG. 13A is a plan view showing the constitution of a lens element aggregation group and a frame and FIG. 13B is an enlarged view showing the principal part of the lens element aggregation group;

FIGS. 17A and 17B are diagrams showing the optical module according to the eleventh embodiment of the invention, wherein FIG. 17A is a top view of the optical module and FIG. 17B is a sectional view taken on line C–C' of FIG. 17A;

FIGS. 19A and 19B are diagrams showing the optical modules according to the twelfth embodiment of the invention, wherein FIG. 19A is a top plan view of the optical module and FIG. 19B is a sectional view taken along a line D–D' of FIG. 19A;

FIGS. 20A and 20B are diagrams showing the external form in the direction of side face of two different kinds of lens elements having different external form; and FIGS. 21A and 21B are sectional views showing the state where the lens element as shown in FIG. 20 is packaged by means of the conventional package method.

DETAILED DESCRIPTION OF THE PREFERRED EMBODIMENTS

Figure 1:
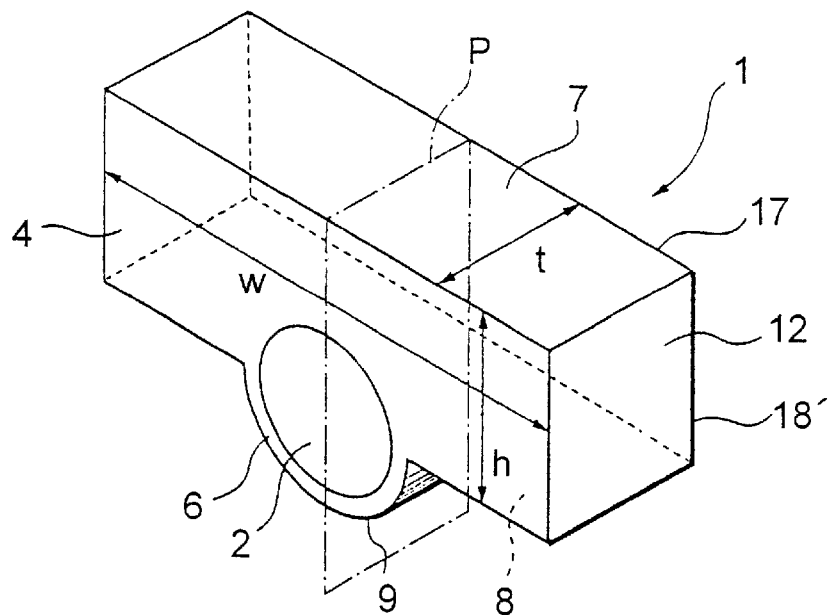
FIG. 1 is a perspective view showing the constitution of a lens element according to the first embodiment of the invention.

The invention will now be described in detail with reference to the accompanying drawings. In the following description and the accompanying drawings, constituents of the invention having almost same function and structure will be denoted with same reference numerals in order to avoid the redundant iterative description. FIG. 1 is a perspective view for showing the constitution of a lens element 1, which is formed of an optical substrate including a lens portion 2 and a lens handling portion (referred to merely as "handling portion" hereinafter) 4 integrated with the lens portion 2.

The lens portion 2 takes the form of a circle in this example and is formed as a diffractive optical element. This lens portion 2 may be formed as a Computer Generated Holographic (CGH) optical element, which is one of diffractive optical elements. In general, this CGH optical element is formed according to the following method, which includes the steps of first designing, with aid of the computer, a photomask pattern necessary for obtaining a desired optical characteristic based on the optical-path difference function of an optical element having a desired optical characteristic, applying the mask pattern to a desired part on the surface of the optical substrate, and applying a etching process to that part, thereby forming a diffractive optical element having a desired optical characteristic.

The handling portion 4 is integrated with the lens portion 2, an edge portion 6, and a projection portion 9 to form a single body. As shown in FIG. 1, the handling portion 4 has a linearly extending shape, and the middle portion between both ends thereof is extended to surround the upper side of the outer periphery of the lens portion 2. Also, the handling portion 4 has a width wider than that of the lens portion 2 in a plane approximately in parallel with the surface of the lens portion 2 and takes the form of an almost rectangular parallelepiped as a whole. In this example, the handling portion 4 is made such that it becomes symmetrical with regard to a virtual plane P passing the optical axis of the lens portion 2 and being perpendicular to the surface of the lens portion 2 as well as to the extension direction of the handling portion 4. In the lens element 1, the surface on which the lens portion 2 is formed is referred to as a lens formation plane hereinafter. In other words, the lens formation plane includes one surface of the handling portion 4.

For instance, the dimension of the handling portion 4 may be set to be 500 $\mu$m width (w) in the lateral direction of the surface approximately in parallel with the lens formation plane, 100 $\mu$m height (h) in the vertical direction, and 100 $\mu$m thickness (t) in the vertical direction perpendicular to the lens formation plane.

The upper surface perpendicular to the height (h) direction of the handling portion 4 is referred to as an upper flat plane 7. This upper flat plane 7 is a flat surface which extends in the longitudinal direction of the handling portion 4 and is almost at a right angle to the lens formation plane. Two lower surfaces 8 opposing to the upper flat plane 7 on the both sides of the projection portion 9 are surfaces approaching a lens supporting plate when the lens element 1 is mounted on the lens supporting plate. Furthermore, the handling portion 4 has two side surfaces 12 standing at a right angle to the lens formation plane and the upper flat plane 7 as well.

As described above, the lens element 1 is provided with the handling portion 4 projecting in the both lateral directions from the lens portion 2 along the surface of the lens portion 2, so that it becomes possible to handle the lens element 1 by chucking the handling portion 4 by means of a chucking means. It also becomes possible to handle the lens element 1 by vacuum holding the upper flat plane 7 with the help of a vacuum holding means like a negatively pressurized sucker.

Like this, as the lens element 1 can be handled by making use of the handling portion 4, it is prevented that the above chucking means or vacuum holding means is directly in contact with the lens portion 2. With this, the lens portion 2 is not only prevented from being contaminated with oily contaminants, dusts, and so forth, which are brought in by such direct contact as mentioned above, but also prevented from being damaged by such direct contact.

Accordingly, if the handling portion 4 is used for mounting the lens element 1 on the supporting plate, the lens element 1 can be arranged relatively with ease in a predetermined right position and in a predetermined posture as well. With this, the work for assembling an optical module using the lens element 1 can be speeded up and facilitated very much.

The edge portion 6 is located on the lower side of the lens portion 2 and has a shape like a circular arc lying along the circumference of the lens portion 2. The circular arc shaped external form of the edge portion 6 extends from the lens formation plane up to a plane opposing thereto and constitutes a barrel roof shaped portion, or a semi-cylindrical one, which is a part of a circular column having the optical axis of the lens portion 2 as its center axis. This barrel roof shaped portion projecting from the mid portion of the handling portion 4 is referred to as a projection portion 9 hereinafter. Two end faces of this projection portion 9 and the predetermined planes of the handling portion 4 corresponding thereto are on the same plane, respectively, and the lens portion 2 is formed on the plane made up of one end face of this projection portion 9 and the predetermined plane of the handling portion 4 corresponding thereto.

The outer diameter of the circular arc of this projection portion 9 is preferably designed such that it coincides with the outer diameter of the optical fiber optically coupled with the lens element 1 to be mounted on a semiconductor supporting substrate. With this, it becomes possible to match the optical axis of the lens element 1 with that of the optical fiber with ease.

In this example, the circular arc shaped external form of the edge portion 6 is designed such that the outer diameter of the circular arc portion becomes almost constant across the thickness t from the lens formation plane to the rear side plane opposing thereto. If needed, however, it may be possible to design the outer diameter such that it has a certain gradient across the thickness t.

A crystalline substrate can be used as an optical substrate for forming the lens element 1. Especially, if the wave length of the light source of an optical system, to which the lens element 1 is applied, is 1.3 $\mu$m or 1.55 $\mu$m, a silicon crystal substrate can be used as the optical substrate.

Figure 2:
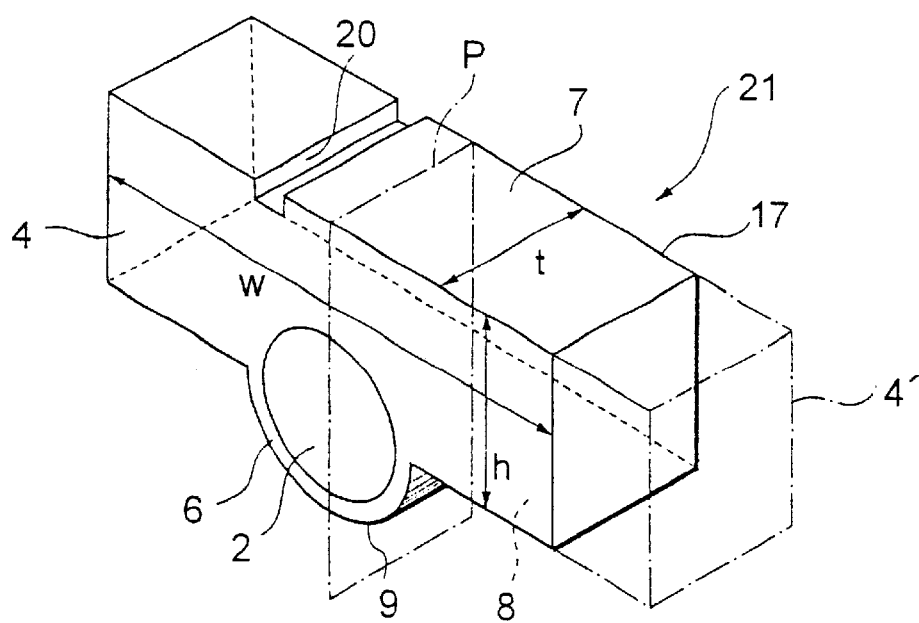
FIG. 2 is a perspective view showing the constitution of a lens element according to the second embodiment of the invention.

FIG. 2 is a perspective view showing the constitution of a lens element 21 according to the second embodiment of the invention. The lens element 21 has a mark 20 as put on the upper flat plane 7 of the handling portion 4, and except this point, the lens element 21 has the same constitution as the lens element 1, thus refraining the iterative description thereabout. In the example shown in FIG. 2, the mark 20 is made in the form of a groove as put on one side portion of the upper flat plane 7 of the handling portion 4. Being provided with the mark 20 like this, the handling portion 4 comes to be asymmetric with respect to a virtual plane P which passes through the optical axis of the lens portion 2 and is perpendicular to the surface of the lens portion2 and to the extending direction of the handling portion 4 as well. The lens portion 2 is formed only on one side plane of the optical substrate.

In FIG. 2, seeing the lens element 21 placed in such a position that the mark 20 comes on the left side of the figure, you would see it with ease, with the help of the mark 20, that the lens portion 2 appears on this side i.e. on your seeing side. That is, the mark 20 has the function of explicitly indicating which side of both planes of the optical substrate the lens portion 2 is formed on.

In addition, a lens portion may be formed on the plane opposing to the lens formation plane as shown in FIG. 2. In this case, even if lens portions formed on both planes have different optical characteristics, the plane of each lens portion can be discriminated with ease by means of the mark 20.

As described above, with provision of the mark 20, the lens portion 2 of the lens element 21 can be discriminated with ease in the work for arranging the lens element 21 in a predetermined place. Therefore, the assembling work of an optical module using the lens element 21 is made very much easier.

Furthermore, it is possible to provide an extension portion 4' on behalf of forming the mark 20, the extension portion 4' extending in one direction, either left or right direction, from a virtual plane P as shown by a virtual line (one dot chain line) of FIG. 2. With this, the handling portion 4 can be made asymmetric with regard to the virtual plane P, and the lens portion 2 of the optical substrate can be discriminated with ease by making use of this asymmetry of the handling portion 4. It is also allowed for the handling portion 4 to have both of the mark 20 and the extension portion 4'.

In the above, there has been described the example wherein the handling portion 4 is laterally and largely extended in both directions, going across the lens portion 2 on the lens formation plane. However, the invention should not be limited to this illustrative embodiment. For instance, the handling portion 4 can be made to take a so-called cantilever-shaped form or an inverted L-shaped form. That is, handling portion 4 extends in the only one lateral direction from the lens portion 2, but not in the other lateral direction from the same.

Figure 3A:
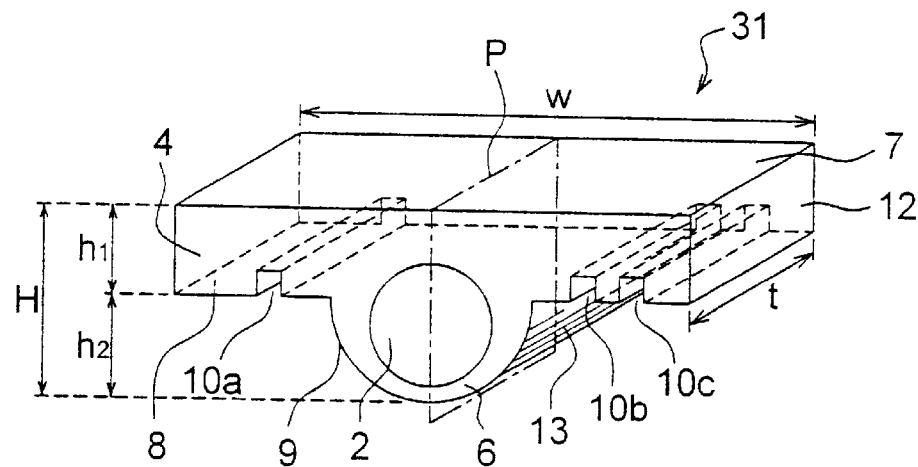
Figure 3B:
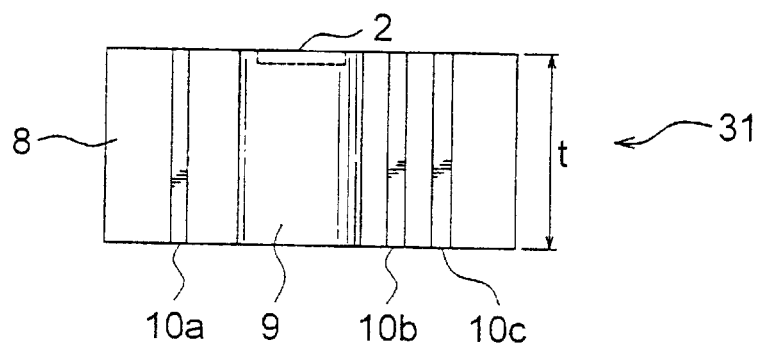
Figure 3C:
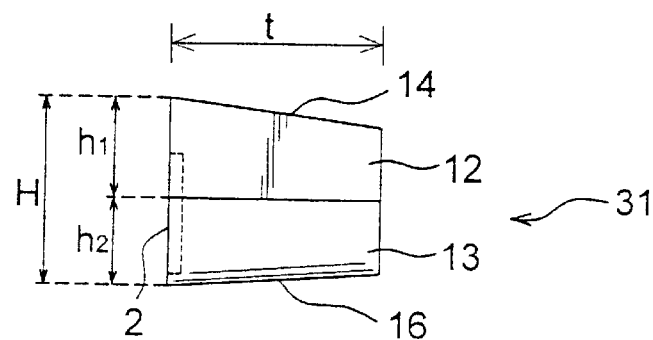

Constitution of a lens element 31 according to the third embodiment of the invention is shown in FIGS. 3A through 3C, wherein FIG. 3A is a perspective view of the lens element 31, FIG. 3B a bottom view of the same, and FIG. 3C a side plan view of the external form of the same, respectively. As will be seen from the above three figures, the lens element 31 is provided with three positioning grooves 10a, 10b, and 10c formed on its bottom plane 8. As shown in FIG. 3C, the height of the lens element 31 is not uniform but slightly varied in the direction of its thickness t. The other constitution is the same as that of the lens element 1, thus the description thereof being refrained.

Three grooves 10a, 10b, and 10c are formed to open toward the lens formation plane and the opposite plane thereof as well, and to extend from the lens formation plane side to the opposite plane thereof, going across the thickness t of the lens element 31. At least one of three grooves 10a, 10b, and 10c is used for positioning of the lens element 31 when mounting it on the supporting substrate. In the example as shown in FIG. 3, each of grooves 10a, 10b, and 10c has an approximately square section, but the sectional shape should not be limited to this. Various sectional shapes may be adopted, for instance a V-shape or the like, a trapezoid or the like, a semicircle or the like, a rectangular or the like, and so forth. The mark as used for the purpose of positioning is not limited to the groove but may be anything if it can function as a guide mark.

Now, assuming a virtual plane P which passes the optical axis of the lens portion 2 and is perpendicular to the extending direction of the handling portion 4, two grooves 10a and 10c are formed in the positions opposing to each other with respect to the vertical plane P. Again, assuming that the virtual plane P is centered, the grooves 10b and 10c are formed on the same side with respect to the virtual plane P. Consequently, the groove 10a and the grooves 10b and 10c are asymmetrically arranged as s whole. Like this, if asymmetrically arranging the grooves, the lens formation plane and the plane opposing thereto can be discriminated with ease, thereby the assembling work of an optical module using the lens element 31 being further facilitated. Needless to say, the groove 10a and either the groove 10b or the groove 10c may be symmetrically positioned with regard to the vertical plane P.

In the next, the change of the height H will be described. Let a side plane visible in the width w direction of the handling portion 4 be a side plane 12. Also, let a side plane visible in the width w direction of the projection portion 9 be a side plane 13. Furthermore, let each vertical height of the side planes 12 and 13 be heights $h_1$ and $h_2$, respectively. In other words, the distance from the top of the projection portion 9 to the bottom plane 8 corresponds to the height $h_2$. The height H is defined as a sum of the height $h_1$ of the side plane 12 of the handling portion 4 and the height $h_2$ of the side plane 13 of the projection portion 9. That is, the height H corresponds to the height of the lens element 31 when seeing it in the direction of its width w. This height H is not uniform and slightly changes along the direction of thickness t of the lens element 31. FIG. 3C is a side plan view of the lens element 31 when seeing it in the direction of its width w. An upper edge line 14 shows the uppermost portion of the side plane 12 while a lower edge line 16 shows the lowermost portion of the side plane 13. As shown in FIG. 3C, two lines 14 and 16 are slightly slanted with respect to the perpendicular line of the lens formation plane, and the height H is gradually reduced along the path from the lens formation plane side to the plane side opposing thereto, so that when seeing the lens element 31 in the direction of its width w, it comes to show a trapezoidal external form or the like. The change in this height H is so small, but FIG. 3C exaggeratingly shows it for better understanding.

Figure 4:
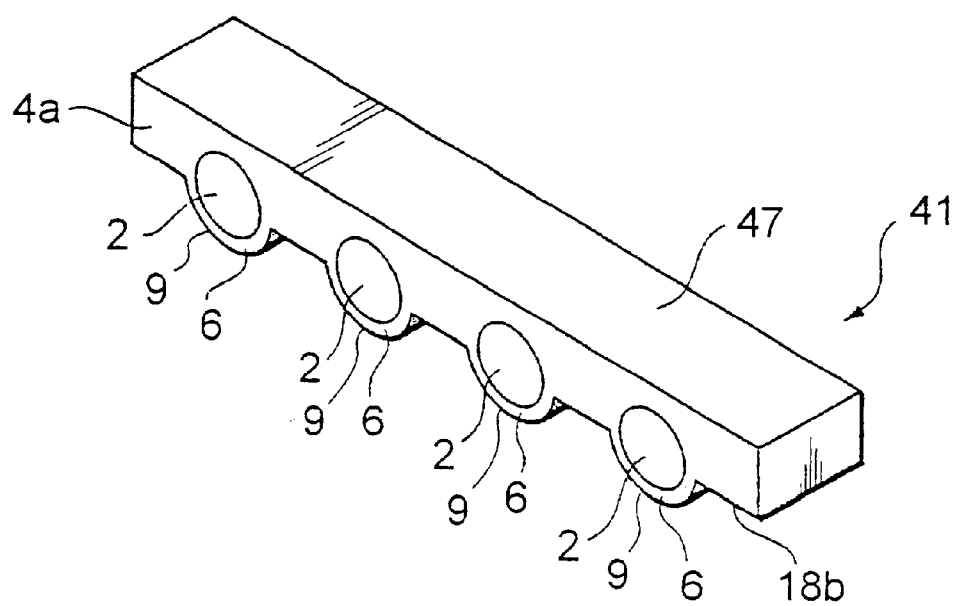
FIG. 4 is a perspective view showing the constitution of a lens element array according to the fourth embodiment of the invention.

FIG. 4 is a perspective view showing the constitution of a lens element array 41 according to the fourth embodiment of the invention. The lens element array 41 is made up of a plurality of lens elements 1 which are connected in series with one another to form an array extending in one direction. That is, the lens element array 41 is made of the optical substrate and includes a plurality of lens portions 2 arranged to form an array thereof, a plurality of edge portions 6, each of which is located on the lower side of the external circumference of each lens portion 2 and has a circular arc shape lying along the circular circumference of the lens portion 2, and a handling/supporting portion 4a which is formed to connect and integrate all of the lens portions 2. The handling/supporting portion 4a is connected with each lens portions 2 on the other side of the external circumference thereof, extends in the direction of the aligned lens portions 2 on the surface approximately in parallel with the surface of the lens portions 2, going across the lens portions 2, and connects and supports all the lens portions 2. The upper plane of the handling/supporting portion 4a is flatly formed as an upper flat plane 47 in order to make it possible to suck and hold the handling/supporting portion 4a by means of vacuum.

Similar to the case of the lens element 1, the edge portion 6 of the lens element array 41 extends the circular arc shaped external form of it from the lens formation plane side to the opposite plane side to form the projection portion 9. In this case, it is preferable that the outer diameter of this projection portion 9 coincides with that of the optical fiber optically connected with the lens element array 41 when mounting the lens element array 41 on the semiconductor substrate. With this, the optical axis of each lens portion 2 in the lens element array 41 can come to coincide with that of the corresponding optical fiber with ease. In FIG. 4, all the projection portions are drawn as if they had the same outer diameter. However, if the outer diameter of the optical fiber coupled with the lens portion is made different depending on the lens portion, each projection portion 9 may be formed to have a different outer diameter corresponding to that of the optical fiber.

Furthermore, the lens element array 41 may be provided with the mark 20 as shown in FIG. 2 and the groove for positioning use as shown in FIGS. 3A and 3B.

Still further, in the above lens element and lens element array, the edge portion 6 is formed so as to surround in part the outside circumference of the lens portion 2, but it is also possible to form the edge portion 6 such that the outside circumference of the lens portion 2 serves as an element constituting the edge portion 6.

A method for manufacturing lens elements as described before will now be explained in the following, with reference to FIGS. 5A through 5D, and FIGS. 6 and 7. The following description is mainly directed to the method for manufacturing the lens element 1, but the method is applicable not only to variations of the lens element 1, but also to lens elements 21, 31, lens element array 41, and variations derived therefrom.

Figure 5A:
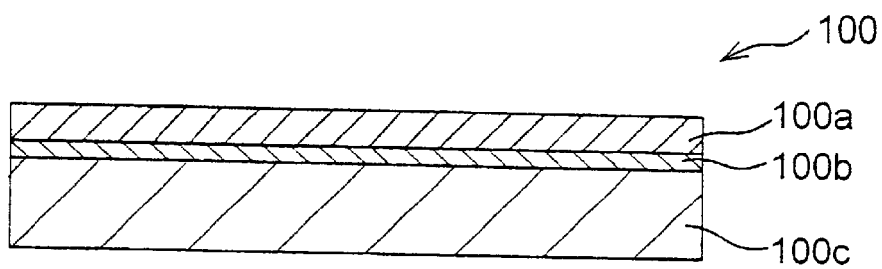
FIGS. 5A through 5D are typical sectional views for explaining the steps of manufacturing a lens element according to the fifth embodiment of the invention.

A manufacturing method according to the fifth embodiment of the invention will now be explained with reference to FIGS. 5A through 5D, 6, and 7. FIGS. 5A through 5D are typical cross sectional views for explaining the manufacturing process. In this example, a semiconductor substrate of the Silicon-On-Insulator (SOI) type (referred to as "SOI substrate" hereinafter) is first prepared as an optical substrate 100. As shown in FIG. 5A, the SOI substrate 100 has such a structure that is made up of an upper SOI layer 100a, a lower Si layer 100c and a middle $SiO_2$ layer 100b sandwiched between the above two layers 100a and 100c. The SOI layer 100a is made of silicon. For instance, a silicon wafer of 4-inch outer diameter can be used for forming the SOI substrate 100. The thickness of each layer in this example is as follows. That is, the SOI layer 100a has a thickness of 100 $\mu$m, the $SiO_2$ layer 100b has a thickness of 1 to 2 $\mu$m, and the Si layer 100c has a thickness of 500 $\mu$m.

Figure 5B:
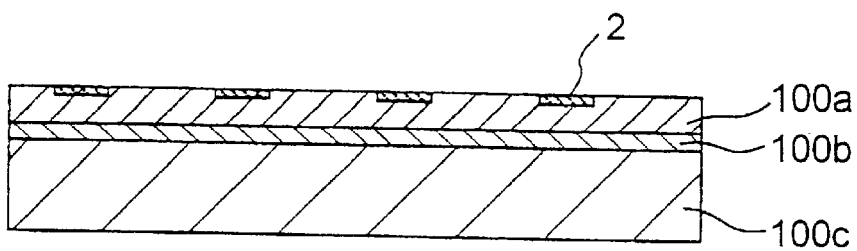

Then, as shown in FIG. 5B, a plurality of lens portions 2 are formed on the surface of the SOI layer 100a at predetermined intervals. In the formation of these lens portions 2, it is possible to make use of photo-lithography and etching technique such as a Reactive Ion Etching (RIE) method and so on which is used in the process of manufacturing semiconductor device. That is, a lot of lens portions 2 having desirable optical characteristics can be formed all at once and with high precision, by applying the photo-lithography and etching technique to the surface of the SOI layer 100a.

Figure 5C:
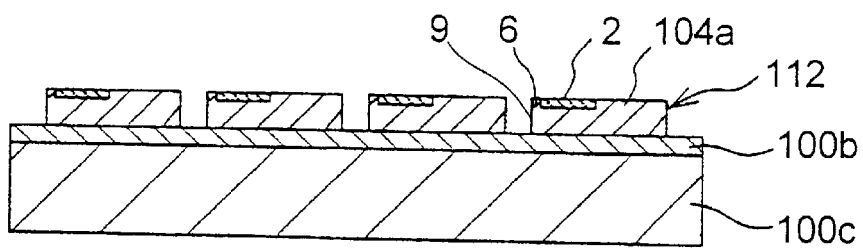
Figure 6:
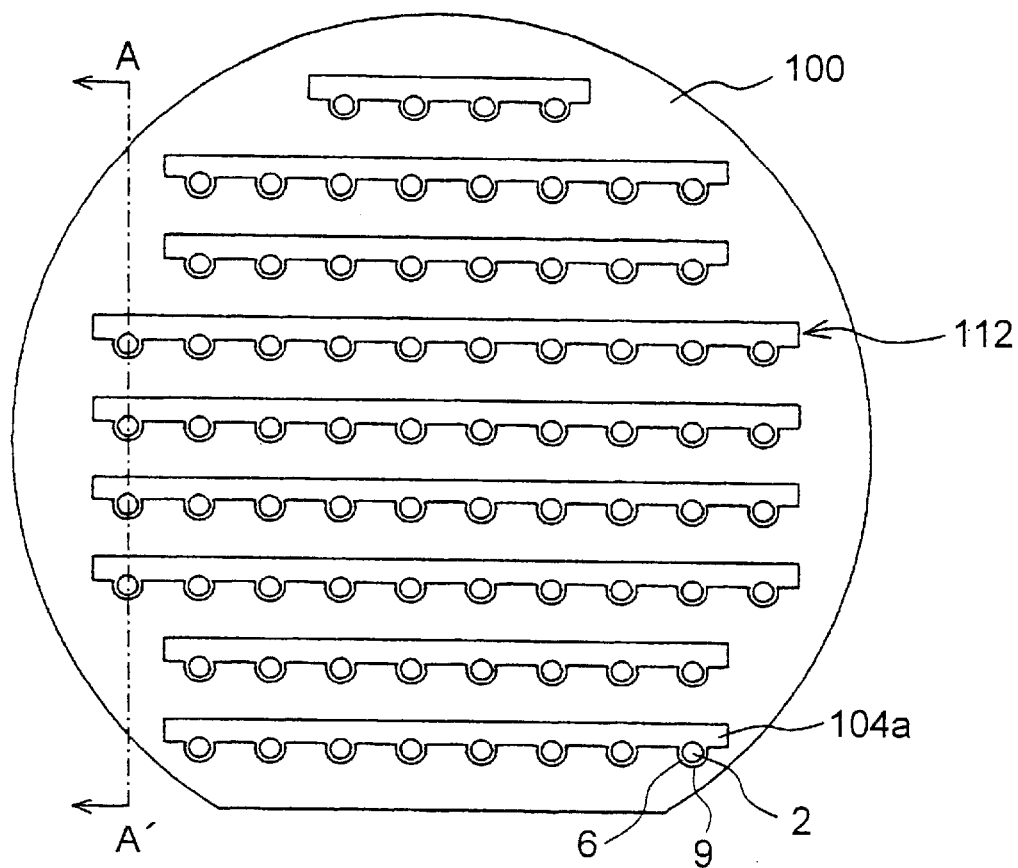
FIG. 6 is a top plan view showing the constitution of a lens element aggregation as formed on a substrate in the manufacturing steps as illustrated in FIG. 5.

In the next step as shown in FIG. 5C, the edge portion 6, the projection portion 9, and the handling/supporting portion 104a are formed in contact with the circumference of each lens portion 2. FIG. 6 is a top plan view showing the resultant of the above step, and FIG. 5C is a sectional view corresponding to that which is taken on line A–A' of FIG. 6. As will be seen from FIG. 6, a plurality of lens portions 2 are formed into a plurality of rows on the SOI substrate 100. The edge portion 6 is formed taking the form of a circular arc as drawn along a part of the outer circumference of each lens portion 2. The circular arc shaped external form of the edge portion 6 is extended from the surface of the SOI layer 100a to the surface of the $SiO_2$ layer 100b, thereby the barrel roof shaped projection portion 9 being formed. Furthermore, the handling/supporting portion 104a is such that it is connected with the lens portion 2 through the other side of its circumference, and extends on a plane approximately in parallel with the surface of the lens portion 2, going across the lens portion 2 in the row direction thereof, and connects and integrates all the lens portions 2 contained in one row to form a bar-shaped lens element aggregation 112. As a result, the bar-shaped lens element aggregation 112 comes to include a plurality of lens portions 2 aligned in one row and the handling/supporting portion 104a integrating those lens portions 2 and extending in one direction. Therefore, a plurality of bar-shaped lens element aggregations 112 are formed into a plurality of rows on the SOI substrate 100.

This process (FIG. 5C) is an etching process for chemically etching the SOI substrate 100 including a plurality of lens element aggregations 112 by using a photomask provided with a pattern corresponding to that of lens element aggregations 112 as arranged on the SOI substrate 100. This etching process is continuously carried out until the surface of the $SiO_2$ layer 100b positioned between every two adjacent lens element aggregations 112 is exposed. With this, each lens element aggregation 112 is formed on the substrate.

Figure 5D:
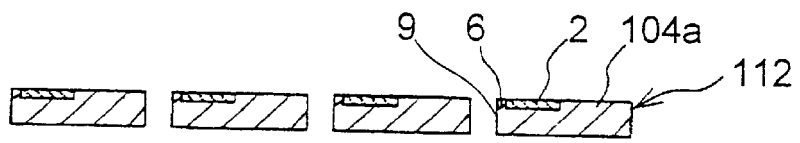

After the above etching process, the entirety of the substrate is dipped into a solution of hydrofluoric acid (HF). The HF solution acts on the SiO2 layer 100b to remove it but does not act on the Si layer 100c and SOI(Si) layer 100a, so that the SOI layer 100a is separated from the Si layer 100c. If there is a certain solution capable of performing the same selective etching as the HF solution, it may be used on behalf of the HF solution. With separation of the lens element aggregation 112 from the Si layer 100c lying thereunder, each of bar-shaped lens element aggregations 112 is separated from the substrate as shown in FIG. 5D.

Figure 7:
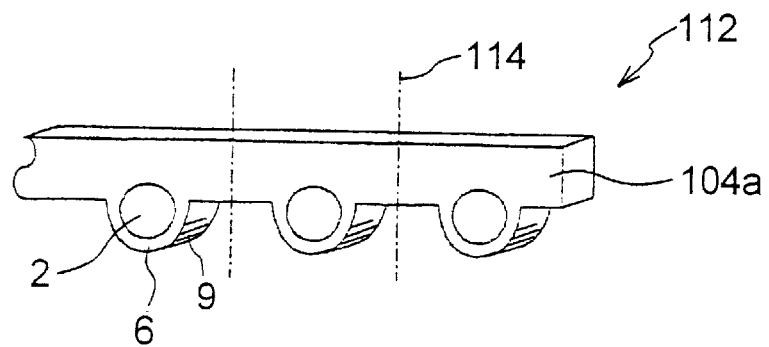
FIG. 7 is a perspective view showing the principal part of the constitution of the lens element aggregation as formed in the process of manufacturing lens elements according to the fifth embodiment of the invention.

FIG. 7 is a perspective view showing the principal part of the constitution of the lens element aggregation 112. As described above, the handling/supporting portion 104a extending in one direction and a plurality of lens portions 2 are connected with each other, thereby being integrated into a single body as a whole, which constitutes a bar-shaped lens element aggregation 112. Consequently, in the following manufacturing process, it becomes possible to handle the lens element aggregation 112 including a plurality lens portions as one unit. In other words, it becomes possible to handle a plurality of lens portions 2 in a lump by means of the lens element aggregation 112.

Immediately before the mounting process of the lens element 1, the bar-shaped lens element aggregation 112 is cut off at a desired cutting position 114 (see FIG. 7), thereby forming a single lens element 1. The cutting position 114 is determined such that it is located between adjacent lens portions 2 connected with the handling/supporting portion 104a. After the lens element aggregation 112 is divided into single lens elements 1 with the above cutting process, the handling/supporting portion 104a of the lens element aggregation 112 comes to function as the handling portion 4 for each lens element 1 as separated.

In the above description, there have been explained the lens element 1 having one lens portion 2 and the method of manufacturing the same. However, this method can be used for manufacturing the lens element array having a plurality of lens portions 2. The lens element array having two or more lens portions 2 can be manufactured by setting the cutting position 114 (FIG. 7) not between adjacent lens portions but by setting it in a desired position appropriately. For instance, the lens element array 41 having four lens portions as shown in FIG. 4 can be manufactured by setting the cutting position 114 such that the handling/supporting portion 4a includes four lens portions 2. Furthermore, it is possible to first design a lens element aggregation 112 having a desired number of lens portions 2 and then, to manufacture a desired lens element array by using the above lens element aggregation 112 itself without cutting it off any more.

The above cutting process may be carried out by using a dicing saw, a diamond blade, and so forth. In this case, the side faces 12 of the lens element 1 after cutting come to have a quality depending on the way of cutting it.

As described above, according to the fifth embodiment of the invention, there is formed, in the manufacturing process, the lens element aggregation 112, Wherein a plurality of lens portions 2 are connected together by means of the handling/supporting portion 104a to be integrated into one body. With this, even after forming lens portions 2, it becomes unnecessary to handle lenses separated in pieces, and it becomes possible to handle a plurality of lens portions in a lump. This brings an advantageous effect that collection and handling of lens elements are carried out with ease. Furthermore, in the process of forming a thin film for coating use, such as an anti-reflection film, an optical filter film, and so forth, what has to be done is just to put lens element aggregations 112 into the vapor deposition apparatus. If the position of the lens element aggregation in the vapor deposition apparatus is adjusted such that it directs to a predetermined direction, all the lens elements forming the lens element aggregation simultaneously come to direct to the same predetermined direction as the lens element aggregation. This means that all the film formation planes of lens elements direct to the same predetermined direction. Accordingly, uniform thin films can be formed under the same condition with high quality and accuracy. Furthermore, as lens elements are not handled individually, manpower and time needed for handling them individually can be saved to a great extent. Handling of lens elements is made very much easier.

Figure 8:
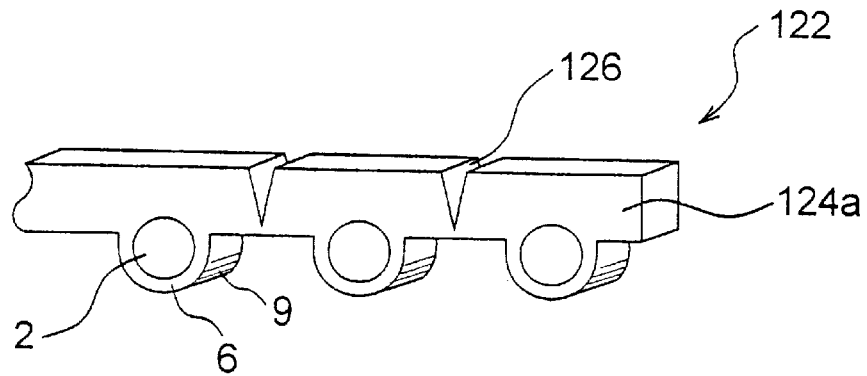
FIG. 8 is a perspective view showing the principal part of the constitution of a lens element aggregation as formed in the process of manufacturing lens elements according to the sixth embodiment of the invention.

FIG. 8 is a perspective view showing the principal part of the constitution of a lens element aggregation 122 as formed in the process of manufacturing lens elements according to the sixth embodiment of the invention. In this embodiment, the constitution of the handling/supporting portion of the lens element aggregation is different from that of the fifth embodiment as described above. Therefore, the following description will be made focusing only on this different point, and the similar points, for instance the manufacturing process of the lens portion 2 and so on, will not be touched to avoid the repetitive redundant description.

According to this sixth embodiment, a lens element aggregation 122 is formed on behalf of the lens element aggregation 112 according to the fifth embodiment. The lens element aggregation 122 is made in the form of a bar and includes a plurality of lens portions 2 arranged to extend in one direction at a predetermined interval, and a handling/supporting portion 124a extending in this direction. As shown in FIG. 8, the handling/supporting portion 124a is formed such that it is connected with each upper side circumference of lens portions 2 as aligned to make a row of them, and extends in the direction of this row, going across these lens portions 2 on a plane approximately in parallel with the surface of the lens portion 2, and connects all the lens portions 2 included in one row to integrate them. Still further, the handling/supporting portion 124a includes a plurality of nicks 126.

The nick 126 is located between adjacent lens portions 2 of the handling/supporting portion 124a. The position of the nick may be formed to coincide with the cutting position 114 as shown in FIG. 7. The nick is formed as a groove having a V-shaped cross section, which extends in the direction perpendicular to the longitudinal direction of the handling/supporting portion 124a.

The first step to be taken for forming the lens element aggregation 122 is to design a pattern of which the form corresponds to the lens element aggregation 122 including the handling/supporting portion 124a having nicks 126 and then, a photomask pattern is prepared based on this pattern. The lens element aggregation 122 is then formed through a predetermined etching process using the above pattern as a photomask pattern in the same manner as the lens element aggregation 112 in the fifth embodiment of the invention.

Figure 9:
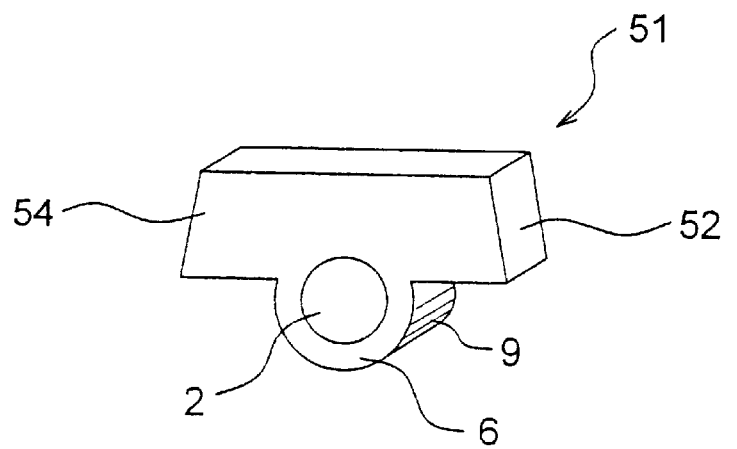
FIG. 9 is a perspective view showing the constitution of a lens element produced from the lens element aggregations as shown in FIG. 8.

Immediately before moving to the process of mounting the lens element 51, the lens element aggregation 122 is fractured at respective nicks 126, and is divided into a plurality of individual lens elements 51 as shown in FIG. 9. Due to presence of the nick 126, the handling/supporting portion 124a can be fractured with ease at the nick 126 only by applying a weak force to an appropriate part of the lens element aggregation 122. The lens element 51 is similar to the lens element 1 as shown in FIG. 1 except only one point that the former has a side face 52 different from that of the latter with respect to the form thereof. The side face 52 of the lens element 51 includes a part of the nick 126 as formed by etching and a fracture-plane resulting from the fracture of the handling/supporting portion 124a. A part separated from the handling/supporting portion 124a by the above fracture is called a handling portion 54. Similar to the handling portion 1, this handling portion 54 facilitates the handling of individual lens elements in the process of mounting them.

Figure 10:
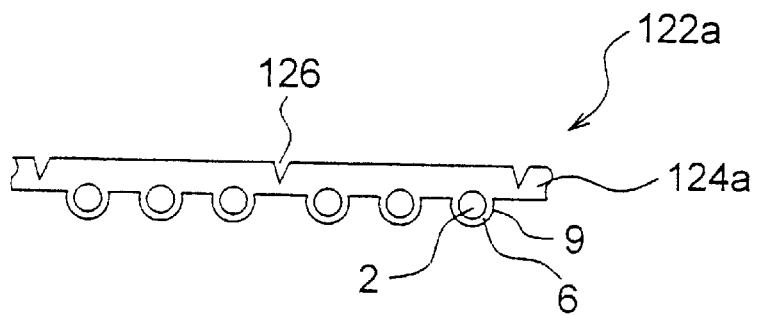
FIG. 10 is a plan view showing the principal part of the constitution with regard to the variation of the lens element aggregation as shown in FIG. 8.

In the above, there has been explained such an example that the lens element 1 has one lens portion 2. However, the invention should not be limited by this example. For instance, a lens element array having a plurality of lens portions can be manufactured by properly setting the position of the nick 126 provided on the handling/supporting 124a in the similar manner that there are set the cutting position 114 in the fifth embodiment. FIG. 10 is a plan view showing the principal part of the lens element aggregation 122a as formed in the process of manufacturing a lens element array including three lens portions 2. In FIG. 10, the nick 126 is provided every three lens portions 2.

As described above, according to the sixth embodiment of the invention, similar to the fifth one, there is formed, in the manufacturing process, the lens element aggregation 122, into which a plurality of lens portions 2 connected together by means of the handling/supporting portion 124a are integrated. With this, no work handling lenses separated in pieces becomes necessary even after formation of lens portions 2, and it becomes possible to handle a plurality of lens portions in a lump. As the result, there can be obtained such an advantageous effect that collection and handling of lens elements are carried out with ease. Furthermore, in the process of forming a thin film such as an anti-reflection film, an optical filter, and so forth, what has to be done is just to put lens element aggregations 122 into the vapor deposition apparatus. If the position of the lens element aggregation in the vapor deposition apparatus is adjusted such that it directs to a predetermined direction, all the lens elements forming the lens element aggregation simultaneously come to direct to the same predetermined direction as the lens element aggregation. This means that all the film formation planes of lens elements direct to the same predetermined direction. Accordingly, uniform thin films can be formed under the same condition with high quality and accuracy. Furthermore, as lens elements are not handled individually, manpower and time needed for handling them individually can be saved to a great extent. Handling of lens elements is made very much easier. Still further, in addition to the effect obtainable from the fifth embodiment, provision of the nick 126 brings such an effect that lens elements can be divided into an individual one with ease.

Figure 11:
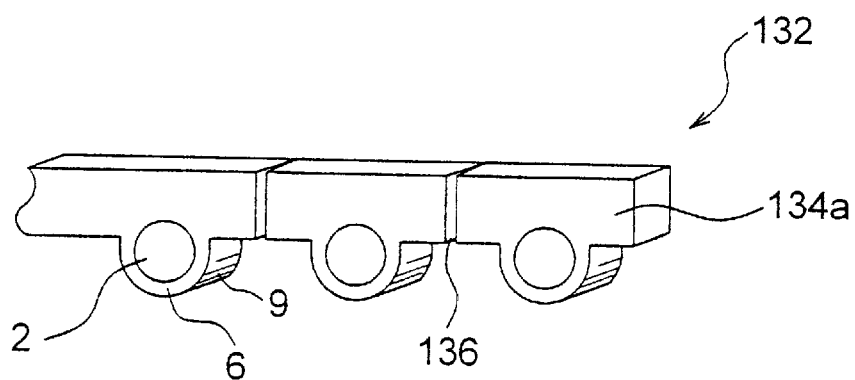
FIG. 11 is a perspective view showing the principal part of the constitution of a lens element aggregation as formed in the process of manufacturing lens elements according to the seventh embodiment of the invention.

FIG. 11 is a perspective view showing the principal part of the constitution of a lens element aggregation 132 as formed in the process of manufacturing lens elements according to the seventh embodiment of the invention. In this embodiment, the constitution of the nick as formed on the handling/supporting portion is different from that which is formed and used in the above sixth embodiment. Therefore, the following description will be made focusing only on this different point, and the similar points, for instance the manufacturing process of the lens portion 2 and so on, will not be described to avoid the repetitive redundant description.

According to this seventh embodiment, a lens element aggregation 132 as shown in FIG. 11 is formed on behalf of the lens element aggregation 122 according to the sixth embodiment. The lens element aggregation 132 is made in the form of a bar and includes a plurality of lens portions 2 arranged to extend in one direction at a predetermined interval, and a handling/supporting portion 134a extending in this direction. As shown in FIG. 11, the handling/supporting portion 134a is formed such that it is connected with each upper side circumference of lens portions 2 as aligned to make a row of them, and extends in the direction of this row, going across these lens portions 2 on a plane approximately in parallel with the surface of the lens portion 2, and connects all the lens portions 2 included in one row to integrate them. Still further, the handling/supporting portion 134a includes a plurality of nicks 136.

The nick 136 is located between adjacent lens portions 2 of the handling/supporting portion 134a. The position of the nick 136 may be formed to coincide with the cutting position 114 as shown in FIG. 7. The nick 136 is formed as a groove having a V-shaped cross section, which opens in the direction perpendicular to the surface of the lens portion 2 and has a depth in the direction also perpendicular to the surface of the lens portion 2. The nick 136 is different from the nick 126 as shown in FIG. 8 with regard to the depth direction of the groove.

The first step to be taken for forming the lens element aggregation 132 is to design a pattern of which the form corresponds to the lens element aggregation 132 including the handling/supporting portion 134a having nicks 136 and then, to prepare a photomask pattern based on this pattern. In this case, however, the most important thing is to design the pattern by taking account of the relation between the size of the opening portion of the nick 136 and the etching rate. In other words, it is needed to precisely design the pattern such that the opening portion of the nick 136 does not reach the opposite plane of the substrate when having finished the etching for forming the lens element aggregation 132. The lens element aggregation 132 is formed in the same manner as the lens element aggregation 112 according to the fifth embodiment, by using this pattern as a photomask pattern.

Immediately before moving to the process of mounting the lens element 1, the lens element aggregation 132 is fractured at respective nicks 136, and is divided into a plurality of individual lens elements similar to the lens element 1 as shown in FIG. 1. Due to presence of the nick 136, the handling/supporting portion 134a can be fractured with ease at the nick 136 only by applying a weak force to an appropriate part of the lens element aggregation 132. The side face of the lens element after being formed includes a part of the nick 136 as formed by etching and a fracture-plane resulting from the fracture of the handling/supporting portion 134a. A part separated from the handling/supporting portion 134a by the above fracture is called a handling portion. This handling portion facilitates the handling of individual lens elements in the process of mounting them.

Similar to the embodiments as have been described so far, an lens element array having a plurality of lens portions 2 may be manufactured by properly setting the position of the nick 136 on the handling/supporting portion 134a.

As described above, according to the seventh embodiment of the invention, similar to the embodiments as have been described thus far, there is formed, in the manufacturing process, the lens element aggregation 132, into which a plurality of lens portions 2 connected together by means of the handling/supporting portion 134a are integrated. With this, no work handling lenses separated in pieces becomes necessary even after formation of lens portions 2, and it becomes possible to handle a plurality of lens portions in a lump. As the result, there can be obtained such an advantageous effect that collection and handling of lens elements are carried out with ease. Furthermore, in the process of forming a thin film such as an anti-reflection film, an optical filter, and so forth, what has to be done is just to put lens element aggregations 132 into the vapor deposition apparatus. If the position of the lens element aggregation in the vapor deposition apparatus is adjusted such that it directs to a predetermined direction, all the lens elements forming the lens element aggregation simultaneously come to direct to the same predetermined direction as the lens element aggregation. This means that all the film formation planes of lens elements direct to the same predetermined direction. Accordingly, uniform thin films can be formed under the same condition with high quality and accuracy. Furthermore, as lens elements are not handled individually, manpower and time needed for handling them individually can be saved to a great extent. Handling of lens elements is made very much easier. Still further, in this embodiment, the plane of the handling/supporting portion 134a on the back side of the lens portion 2 has no opening portion of the nick 136. Therefore, the lens element aggregation 132 can be arranged on a mounting sheet or the like as it is even after forming it, thus facilitating the shift to the mounting step.

Figure 12:
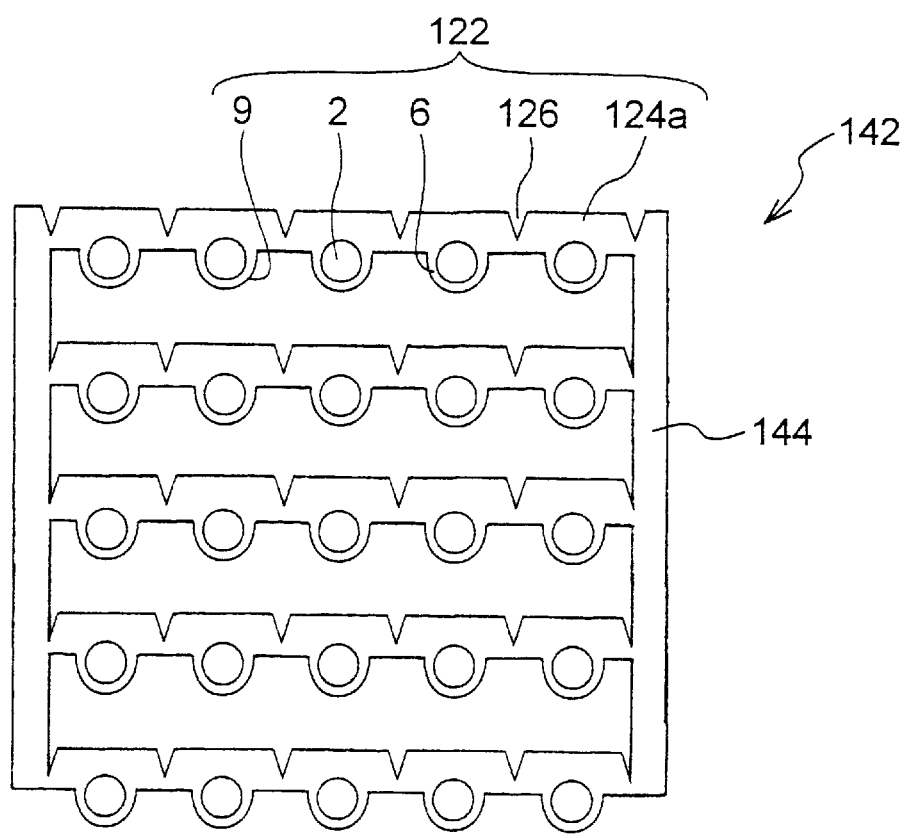
FIG. 12 is a plan view showing a lens element aggregation as formed in the process of manufacturing lens elements according to the eighth embodiment of the invention.

FIG. 12 is a plan view showing a lens element aggregation group as formed in the process of manufacturing lens elements according to the eighth embodiment of the invention. This embodiment adopts the constitution of the lens element aggregation group, which is formed by grouping a series of lens element aggregations. This is only one point that makes the eighth embodiment different from the previous embodiments. Therefore, the following description will be made focusing only on this different point, and the similar points, for instance the manufacturing process of the lens portion 2 and so on, will not be touched to avoid the repetitive redundant description.

In this embodiment, the lens element aggregation group 142 as shown in FIG. 12 is formed on behalf of the lens element aggregation as described before. In this example, the lens element aggregation group 142 adopts such constitution that a plurality of bar-shaped lens element aggregations 122 arranged in the same manner as shown in FIG. 8 are integrated into one body by means of two side connecting portions 144, each of which connects all the end portions located on the same side of the lens element aggregations. In other words, in the lens element aggregation group 142, a plurality of lens portions 2 are formed and arranged in a two-dimensional plane approximately in parallel with the surface of the lens portion 2, and all of these lens portions 2 are connected by means of the handling/supporting portion 124 and the connecting portion 144, thereby being integrated into one body.

When forming the lens element aggregation group 142, the lens element aggregation 112 as shown in FIG. 7 or the lens element aggregation 132 as shown in FIG. 11 may be used in place of the lens element aggregation 122. Also, the lens element aggregation group 142 may be made up of a plurality of lens portions 2 as arranged in the two-dimensional form, the handling/supporting portion and connecting portion which connect all the lens portions 2 to integrate them into one body. In this example, the lens element aggregation group 142 is made up of a plurality of lens element aggregations including nicks 126, but the presence of the nick is not always an indispensable matter.

The first step to be taken for forming the lens element aggregation group 142 is to design a pattern of which the form corresponds to the lens element aggregation group 142 in the above-mentioned form. The lens element aggregation group 142 is then formed through a predetermined etching process using the above pattern as a photomask pattern in the same manner as the lens element aggregation 112 in the fifth embodiment of the invention.

Immediately before moving to the process of mounting the lens element, the lens element aggregation group 142 is fractured at respective nicks 126, and is divided into a plurality of individual lens elements. The lens element aggregation group 142 has the same nick 126 as the lens element aggregation 122 as shown in FIG. 8, so that the handling/supporting portion 124a and the side connecting portion 144 can be fractured with ease at the nick 126. The side face of the lens element after being formed includes a part of the nick 126 as formed by etching and a fracture-plane resulting from the fracture of the handling/supporting portion 124a. A part separated from the handling/supporting portion 124a by the above fracture is called a handling portion. This handling portion facilitates the handling of individual lens elements in the process of mounting them. Furthermore, similar to the embodiments as previously described, a lens element array including a plurality of lens portions can be manufactured by properly setting the position of the nick 126 on the handling/supporting portion 124a.

As described above, according to the eighth embodiment of the invention, there is formed the lens element aggregation group 142, wherein a plurality of lens portions 2 are connected together by means of the handling/supporting portion 124a and the side connecting portion 144 to be integrated into one body. With this, even after forming lens portions 2, it becomes unnecessary to handle lenses separated in pieces and a plurality of lens portions can be handled in a lump. This brings such an advantageous effect that collection and handling of lens elements are carried out with ease. Furthermore, in the process of forming a coating film such as an anti-reflection film, an optical filter, and so forth, what has to be done is just to put lens element aggregations 142 into the vapor deposition apparatus. If the position of the lens element aggregation in the vapor deposition apparatus is adjusted such that it directs to a predetermined direction, all the lens elements forming the lens element aggregation simultaneously come to direct to the same predetermined direction as the lens element aggregation. This means that all the film formation planes of lens elements direct to the same predetermined direction. Accordingly, uniform thin films can be formed under the same condition with high quality and accuracy. Furthermore, as lens elements are not handled individually, manpower and time needed for handling them individually can be saved to a great extent. Handling of lens elements is made very much easier. Especially, in this embodiment, as the lens element aggregation like ones 112, 122, 122a, and 132 can be handled in a lump, easiness in the collection and handling thereof is enhanced. Furthermore, as the handling/supporting portion of the lens element aggregation group is provided with nicks, separation of the lens element aggregation group into individual lens element is carried out with ease.

In the above example, a plurality of lens element aggregations are connected with one another through both side ends of their handling/supporting portions by means of two side connecting portions, but they may be connected one another through either one of both side ends of the same by means of a single side connecting portions.

Figure 13A:
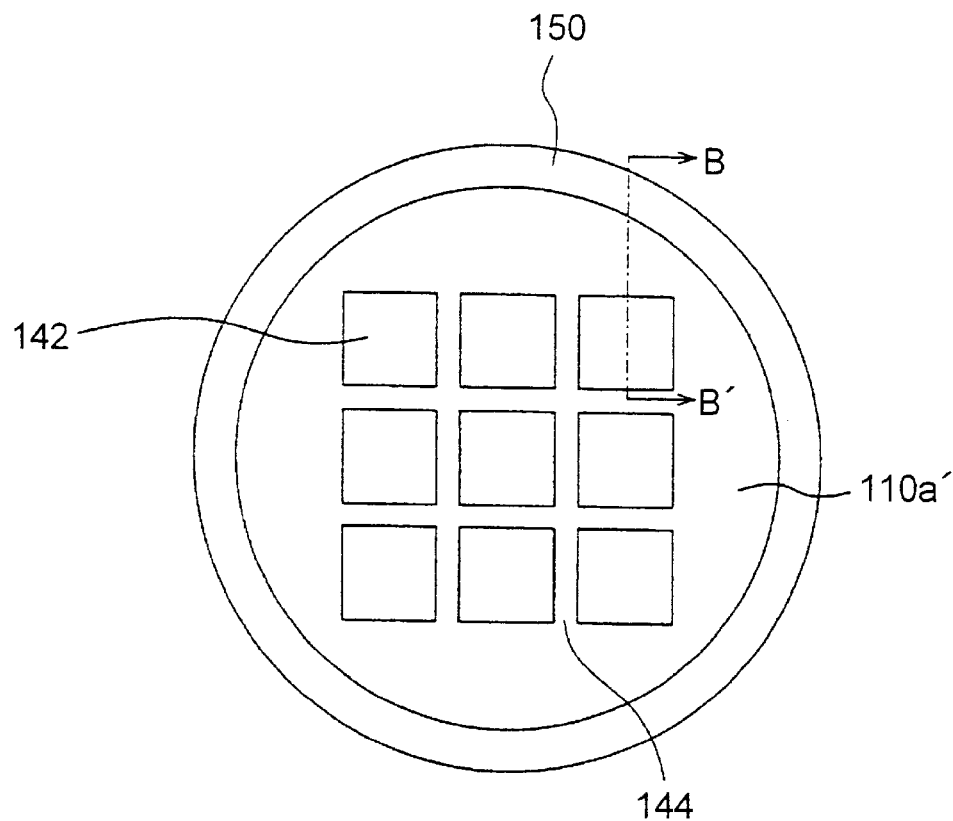
Figure 13B:
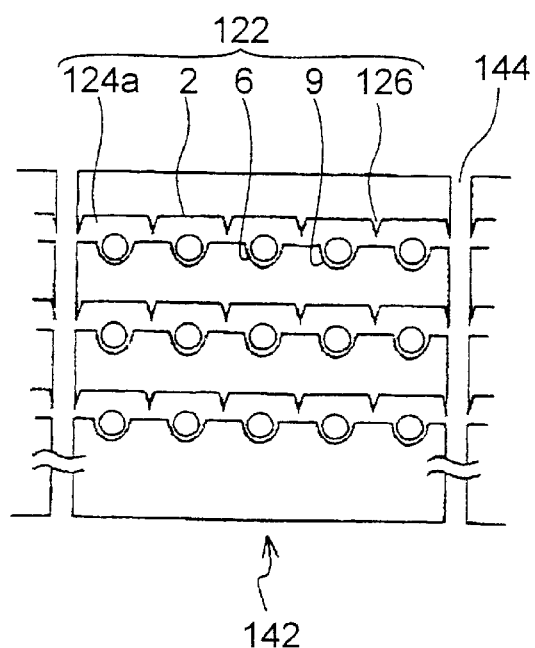

FIGS. 13A and 13B are diagrams for explaining a method for manufacturing a lens element according to the ninth embodiment of the invention, wherein FIG. 13A is a schematic plan view showing the constitution as made up of a plurality of lens element aggregation groups and a frame, all of which are formed on a substrate. As shown in FIG. 13A, a plurality of lens element aggregation groups 142 are formed on an optical substrate 100 while a ring-shaped frame 150 is formed to go along the circumference of the substrate 100. All the lens element aggregation groups 142 are connected with the frame 150, thereby being integrated into one body. The frame 150 is formed to have a thickness which is thicker than that of the lens element aggregation group 142. In FIG. 13A, the detailed constitution of the lens element aggregation group 142 is omitted but FIG. 13B shows it in detail, instead. FIG. 13B is an enlarged view showing a principal part of the lens element aggregation group 142. Adjacent lens element aggregation groups 142 are connected with each other by commonly having a connecting portion 144. The lens element aggregation group 142 can be formed to have such a small size as 1 cm square.

In this embodiment, the constitution of the bar-shaped lens element aggregation formed on the optical substrate 100 is similar to that of the lens element aggregation as shown in FIG. 8. However, the invention should not be limited by this example, and there may be adopted the lens element aggregation 112, 122, 122a, 132, or others than these. The frame 150 may be designed also in an arbitrary form. Whichever lens element aggregations and frames may be adopted, however, a plurality of lens element aggregation groups 142 and the frame 150 as formed on the optical substrate 100 have to be connected with both of the connecting portion and the peripheral portion of the optical substrate, thereby being integrated into one body.

Figure 14A:
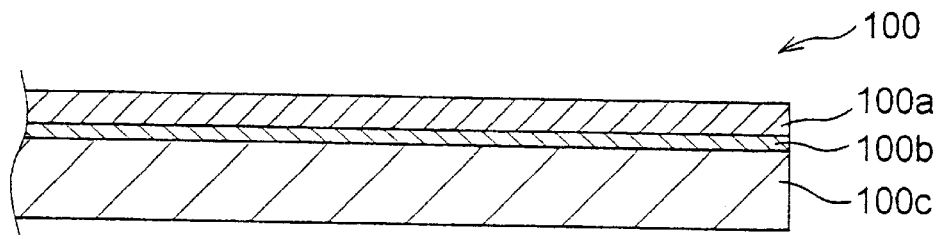
FIGS. 14A through 14e are typical sectional views for explaining the steps of manufacturing lens elements according to the ninth embodiment of the invention.

In the next, an example of a method for manufacturing a lens element according to this embodiment will be described with reference to FIGS. 14A through 14E. These figures are typical sectional views showing a principal part of the manufacturing process and correspond to the sectional views taken along a line B–B' of FIG. 13A. In this example, a circular SOI substrate 100 is used as an optical substrate, for instance. As shown in FIG. 14A, the SOI substrate 100 is made up of a SOI (Si) layer 100a as an upper layer, a Si layer 100c as a lower layer, and a SiO$_2$ layer 100b as an middle layer sandwiched between the above two layers 100a and 100c.

Figure 14B:
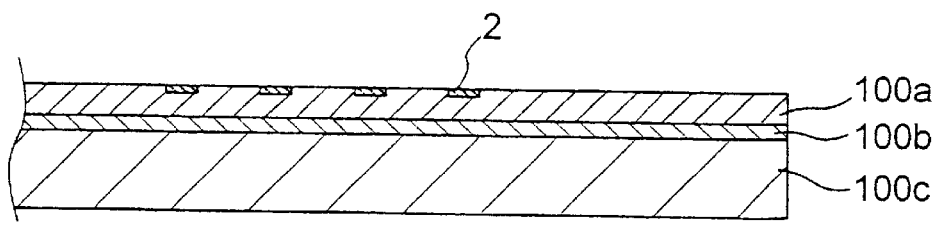

First of all, as shown in FIG. 14B, a plurality of lens portions 2 are formed on the surface of the SOI layer 100a at predetermined intervals. In the formation of these lens portions 2, a lot of lens portions 2 having desirable optical characteristics can be formed all at once and with high precision by treating the surface of the SOI layer 100a by means of the etching technique, for instance the photolithography and etching technique such as a RIE method and so on.

Figure 14C:
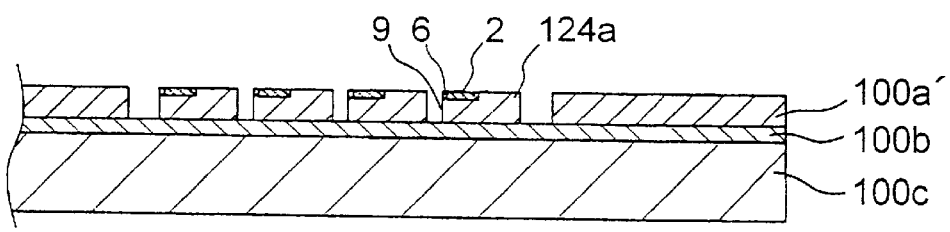

In the next step, as shown in FIG. 14C, the edge portion 6, the projection portion 9, and the handling/supporting portion 124a are formed to surround the circumference of each lens portion 2, and the connecting portion 144 is also formed at the same time, though it is not shown. As the result of forming the above four portions, a peripheral edge portion 100a' made of the SOI layer comes to remain on the peripheral edge of the SOI substrate 100. Each of portions as mentioned above is formed through the process of etching treatment with the help of a photomask pattern. This photomask pattern is prepared based on the arrangement pattern, according to which there are arranged a plurality of lens element aggregation groups 142 of which each includes a plurality of lens element aggregations 122, the connecting portions 144, and the peripheral edge portion 100a'.

Figure 14D:
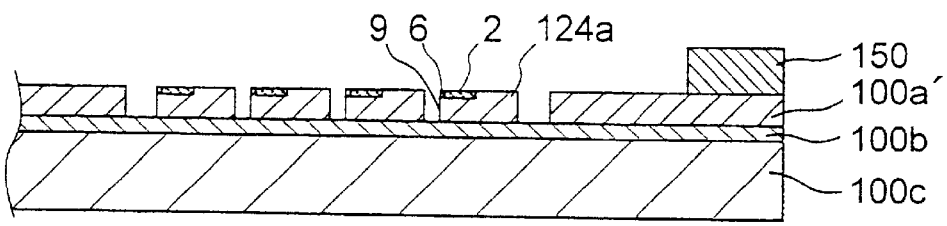

Then, as shown in FIG. 14D, a ring-shaped frame 150 made of Si substrate and having the same outer diameter as the SOI substrate 100, is joined to the external end part of the peripheral edge portion 100a' such that the circumference of the frame 150 coincides with the that of the SOI substrate 100. The frame 150 and the peripheral edge portion 100a' may be joined to each other by the prior art direct joining method as well known or by using other joint material such as solder. If the outer diameter of the circular SOI substrate is four inches, the ring-shaped frame 150 is allowed to have the following dimension, the outer diameter of four inches, the inner diameter of 3.75 inches, and a thickness of 500 µm.

Figure 14E:
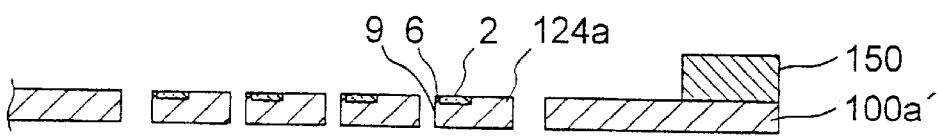

Then, the entirety of the substrate is dipped into a solution of hydrofluoric acid (HF) to remove the SiO$_2$ layer 100b, thereby separating the SOI layer 100a from the Si layer 100c. With this, as shown in FIG. 14E, the Si layer 100c lying under the lens element aggregation 122 is separated and removed, and there is achieved the constitution as shown in FIGS. 13A and 13B, which is made up of a plurality of lens element aggregation groups 142 including a plurality of lens element aggregations 122, the connecting portions 144, the peripheral edge portion 100a', and the frame 150.

As described above, according to the ninth embodiment, there are integrated into one body a plurality of lens element aggregation groups 142 as collectively formed and the frame 150 having a thickness thicker than the lens element aggregation group 142 as formed on the peripheral edge portion 100a'. With this, in addition to the advantageous effects brought by the previous embodiments, there is obtained another effect that the collection and handling of lens elements after forming them are further facilitated, because a great number of lens portions 2 formed on the optical substrate 100 can be handled in a lump. The frame 150 has a sufficient thickness, so that it can firmly support a plurality of lens element aggregation groups 142 with the help of the peripheral edge portion 100a' and the connecting portion 144, thus making it possible to handle the lens element aggregation groups by an automatic machine.

The lens element 21 or the lens element 31 can be manufactured in the same way as the lens element 1 as described before. In this case, the etching treatment is carried out by using a photomask of which a pattern corresponds to the form of the mark 20 or the grooves 10a, 10b, and 10c for use in positioning. With this, the lens element aggregation is formed, from which a plurality of lens elements are produced.

Figure 15:
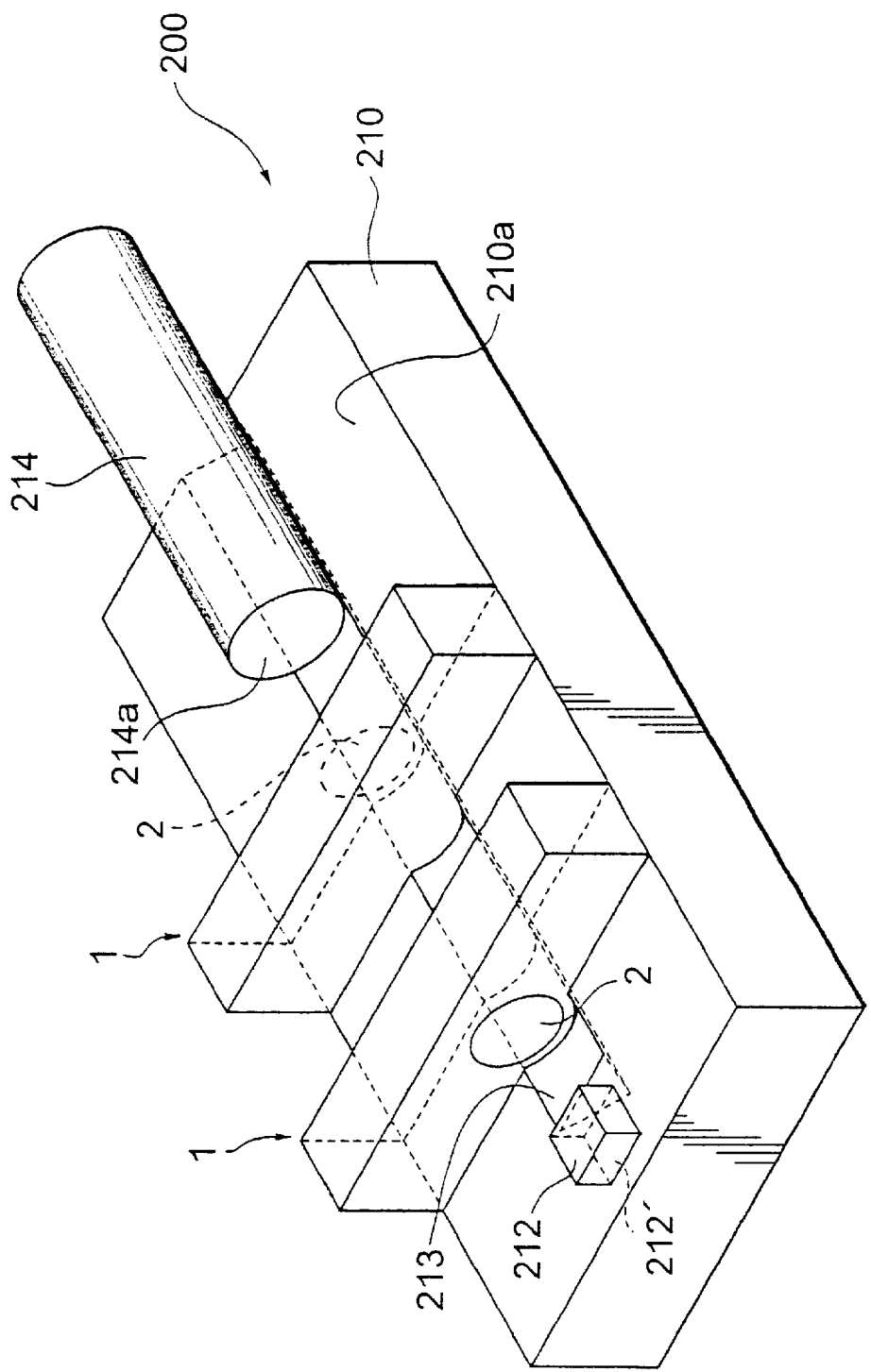
FIG. 15 is a perspective view of an optical module according to the tenth embodiment of the invention.

In the next, an optical module using the above-mentioned lens elements will be described by way of certain examples. FIG. 15 shows a perspective view of an optical module 200 according to the tenth embodiment of the invention. The optical module 200 includes a supporting substrate 210 formed of silicon crystal, for instance; a light source 212 like a laser diode, which is provided on the surface 210a of the supporting substrate 210; an optical fiber 214 arranged such that it lies along a groove 213 formed on the surface 210a of the supporting substrate 210 to receive light rays from the light source 212, one end of it being set at a predetermined position by the groove 213; and two lens elements 1 arranged with a predetermined distance between the optical fiber 214 and the light source 212.

The lens formation surface of the lens element 1 located on the side of the light source 212 is arranged to face to the light source side while the lens formation surface of the lens element 1 located on the side of the optical fiber 214 is arranged to face to the optical fiber side. The lens element 1 on the side of the light source 212 has the collimating function of converting the divergent light rays into the parallel luminous flux when it receives the divergent light rays from the light source 212. The lens element 1 on the side of the optical fiber 214 condenses the above parallel luminous flux toward the center portion of the end face 214a of the optical fiber 214.

The lens portion 2 of the lens element 1 is formed such that the outer diameter of it is smaller than that of the optical fiber 214. The circular arc shaped projection portion 9 is formed such that the outer diameter of it is approximately equal to that of the optical fiber 214. If the optical fiber 214 is formed of a single mode optical fiber, the outer diameter becomes about 125 µm and that of the circular arc shaped projection portion 9 becomes approximately equal to the above.

The groove portion 213 formed on the supporting substrate 210 has a V-shaped cross section. The optical fiber 214 is mounted on the groove portion 213 such that the circumferential wall portion of it is accepted in part by the groove portion 213. With this, the optical fiber 214 comes to be suitably supported by the supporting substrate 210. Two lens elements 1 are arranged such that their projection portions 9 come in contact with the groove 231, respectively. As mentioned above, respective outer diameters of the projection portion 9 and the optical fiber 214 are set to be approximately equal to each other, so that it becomes possible to coincide respective optical axes of the optical fiber 214 and two lens elements 1 with each other by mounting the projection portion 9 and the optical fiber 214 on the groove portion 213 to be accepted in part. At this time, the flat bottom plane 8 of the handling portion 4 of the lens element 1 may ride on the surface 210*a* of the supporting substrate 210. Accordingly, it is possible to fix the lens element 1 to the supporting substrate 210 through the above bottom plane 8.

The light source 212 is fixed to the surface 210*a* through an electrode 212' in the vicinity of the end portion of the groove portion 213. The light emitting plane of the light source 212 is arranged such that its optical axis coincides with that of the optical fiber 214. The electrode 212' can be formed by means of the photolithographic technique as often used in the process of manufacturing semiconductor devices.

In the example as described above, a pair of lens elements arranged between the light source 212 and the optical fiber 214 are identical to each other. However, the invention should not be limited by this example. Two lens elements having different focal distances may be adopted depending on the use of the optical module.

As a variation of the tenth embodiment, it is possible to consider an optical module using the lens array 41 as shown in FIG. 4 on behalf of the lens element 1. In this case, the supporting substrate has a plurality of groove portions, the number of which corresponds to the number of projection portions 9 included in the lens array 41. Also, the interval and the dimension of the groove portion correspond to those of projection portions 9 included in the lens array 41. The lens array 41 is arranged on the supporting substrate such that each projection portion 9 of the lens array 41 comes in contact with each groove portion. The optical fiber is set on each groove portion such that each lens portion 2 of the lens array 41 opposes to each end face of the optical fiber. With arrangement of the lens array and the optical fiber like the above, there is provided the optical module using the lens array, wherein each lens portion 2 is optically coupled with the each optical fiber. In case of the optical module like the above, it is not always necessary for the optical fiber to be arranged on all the groove portions, and the necessary number of the optical fibers may be arranged on the supporting substrate. In this case, it is preferable that the outer diameter of each circular arc shaped projection portion 9 of the lens array 41 is made equal to that of the optical fiber optically coupled with each lens portion 2 corresponding to each projection portion 9.

Figure 16:
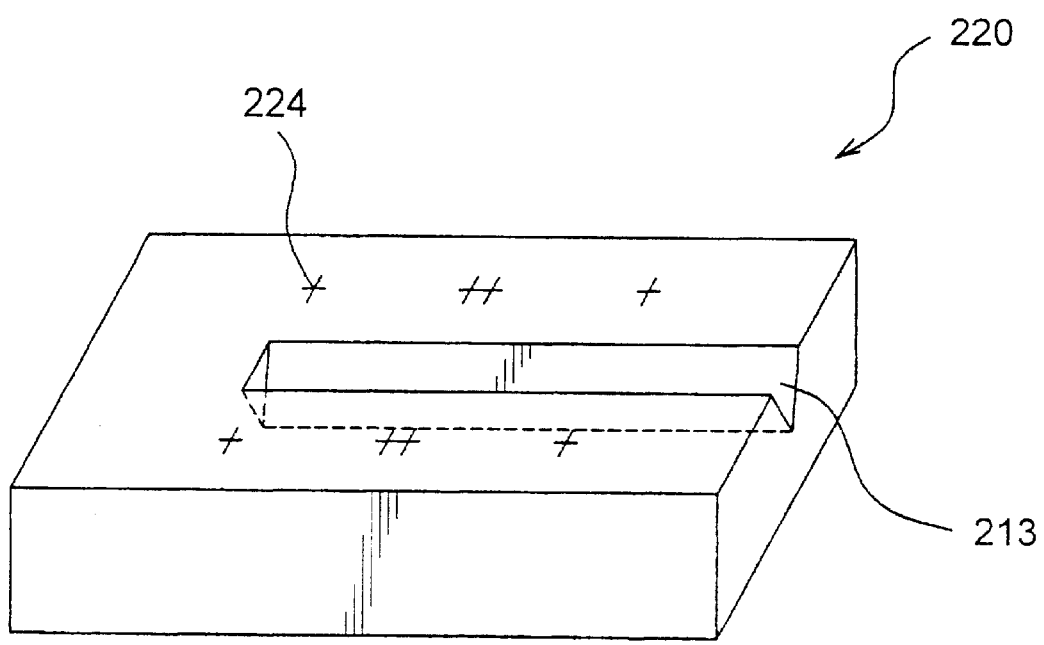
FIG. 16 is a perspective view of a supporting substrate as used for an optical module according to the eleventh embodiment of the invention.

In the next, an optical module using lens elements 31 and a method for packaging the same according to the eleventh embodiment of the invention would be described with reference to FIGS. 16 and 17. FIG. 16 is a perspective view showing a supporting substrate as used for this optical module. The supporting substrate 220 has the groove portion 213 and a plurality of positioning marks 224 on its upper plane. The supporting substrate 220 is formed of silicon crystal, for instance. The groove portion 213 is a groove having a V-shaped cross section.

The positioning mark 224 is a mark used for positioning the lens element 31 when mounting it. In the illustrated example, four positioning marks each, i.e. eight positioning marks in total, are provided on both sides of the groove portion 213. Each position of eight positioning marks 224 is determined to coincide with the position of the opening portions of the grooves 10*a* and 10*c* in the lens formation plane and the opposite plane thereof, when mounting the lens element 31 on the supporting substrate 220. In the illustrated example, the positioning mark is indicated in a cross shape, but it may be expressed in any arbitrary shape other than the cross.

Figure 17A:
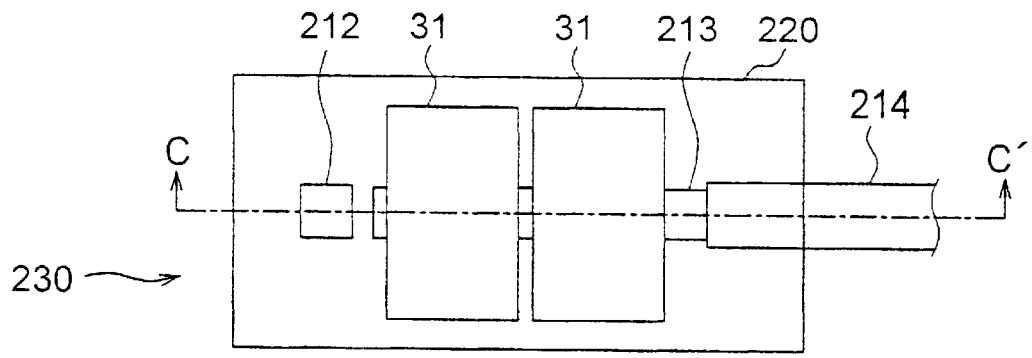
Figure 17B:
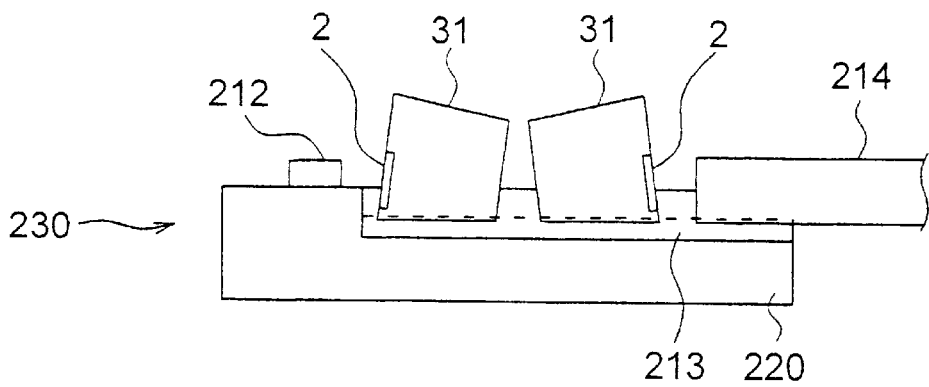

FIGS. 17A and 17B show an example of an optical module 230 using a supporting substrate 220 and a lens element 31. The optical module 230 is made up of a supporting substrate 220, a light source 212 using a laser diode or the like, two lens elements 31, and a optical fiber 214. Each projection portions 9 of two lens elements 31 and the optical fiber 214 are arranged in the groove portion 213 to be accepted in part thereby. The light source 212, two lens elements 31, and the optical fiber 214 are arranged with a predetermined interval and are optically coupled with each other. The lens formation plane of the lens element 31 on the side of the light source 212 is arranged to face to the light source 212 while the lens formation plane of the lens element 31 on the side of the optical fiber 214 is arranged to face the optical fiber 214. The lens element 31 on the side of the light source 212 has the collimating function of converting the divergent light rays into the parallel luminous flux when it receives the divergent light rays from the light source 212. The lens element 31 on the side of the optical fiber 214 has the function of condensing the above parallel luminous flux toward the center portion of the end face of the optical fiber 214. FIG. 17A is a top plan view of the optical module 230 and FIG. 17B is a sectional view taken along a line C–C' of FIG. 17A. A dotted line as shown in FIG. 17B indicates a horizontal position, at which two lens elements 31 and the optical fiber 214 come in contact with the side wall of the groove portion 213.

In the next, there will be explained a method for packaging the optical module 230. At first, the vacuum sucking means seizes the lens element 31 by the upper flat plane 7 of the handling portion 4 of it. Then, the vacuum sucking means carries the lens element 31 to and mounts it on the supporting substrate 220 orienting the lens element 31 in the direction enabling the projection portion 9 of it to come in contact with the groove portion 213. At this time, two lens elements are arranged through the positioning operation referring to a plurality of reference points, that is, the opening portion of the grooves 10*a* and 10*c* formed on the lens formation plane and the opposite plane thereof of the lens element 31 as well as eight positioning marks provided on the supporting substrate 220, and also by making use of the image processing by means of a CCD camera or the like. After it has been confirmed that two lens elements 31 are suitably placed in predetermined positions, respectively, each lens elements 31 is connected with the supporting substrate 220. In the next, the positioning of the light source 212 is carried out with high accuracy by using a marker for instance in regard to the upper portion of the supporting substrate 220, and then, the light source 212 is connected with the electrode 212' on the supporting substrate 220 by means of solder bumps or the like. Finally, the optical fiber 214 is mounted on the groove portion 213 such that the circumferential wall of it comes in contact with the side wall of the groove portion 213 and then, is connected therewith by using a suitable resin or the like.

As described above, in the eleventh embodiment, the positioning of elements forming the optical module is carried out by using the grooves 10*a* and 10*c* provided on the bottom plane 8 of the handling portion 4 of the lens element 31 and the positioning marks 224 provided on the supporting substrate 220. With this, even if a lens element has such an external form as the lens element 31, of which the height H gradually changes from the lens formation plane side toward the opposite plane side thereof, it can be easily mounted with high accuracy of ±1 μm in a short period of time. As will be described later in connection with an example for comparison purpose, when using a prior art method for mounting a lens element having an external form similar to that of the lens element 31, a certain error is caused by which the optical coupling efficiency is reduced. Contrary to this, according to the invention, the lens element is provided with the positioning grooves 10a and 10c while the supporting substrate is provided with the positioning marks, so that it becomes possible to carry out the highly accurate mounting with ease.

Figure 18:
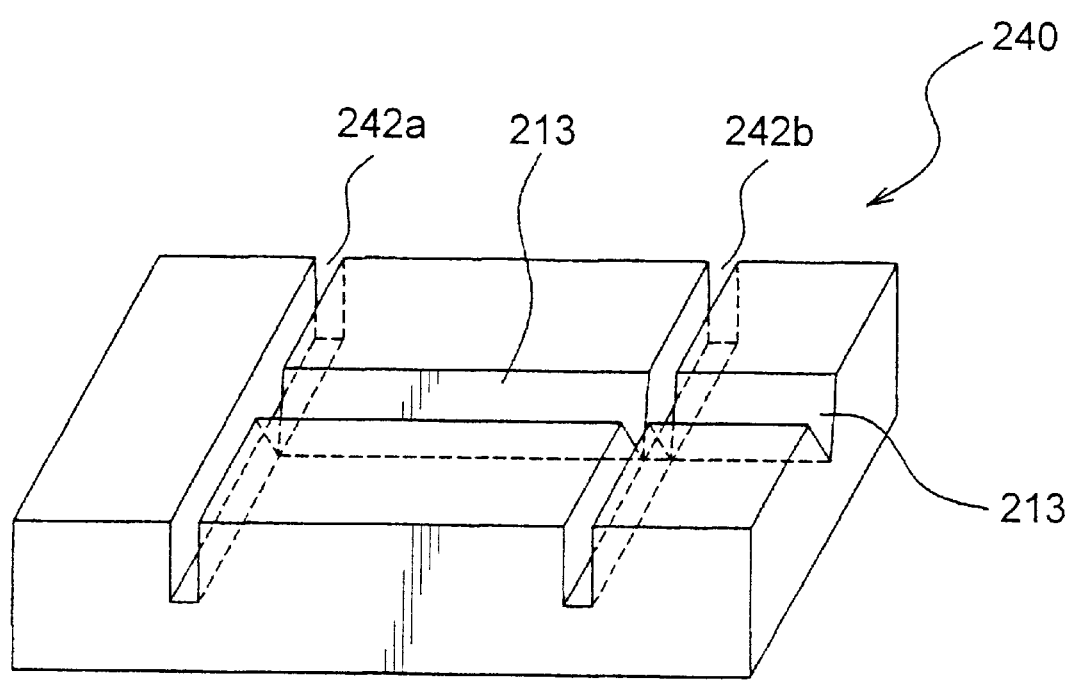
FIG. 18 is a perspective view showing a supporting substrate for use in an optical module according to the twelfth embodiment of the invention.

In the next, an optical module using lens elements 31 and a method for packaging the same according to the twelfth embodiment of the invention will be described with reference to FIGS. 18, 19A, and 19B. FIG. 18 is a perspective view showing a supporting substrate as used for this optical module. The supporting substrate 240 has the groove portion 213 and two recesses 242a and 242b intersecting the groove 213 at right angles on its upper plane. The supporting substrate 240 is formed of silicon crystal, for instance. The groove portion 213 is a groove having a V-shaped cross section.

The recesses 242a and 242b are grooves for use in positioning of the lens element 31 when mounting it and have a rectangular cross section. These recesses can be formed by dicing for instance. In the current embodiment, the positioning of the lens element 31 is carried out by using the recesses 242a and 242b as the positioning marks on behalf of the positioning marks 224 used in the eleventh embodiment.

Figure 19A:
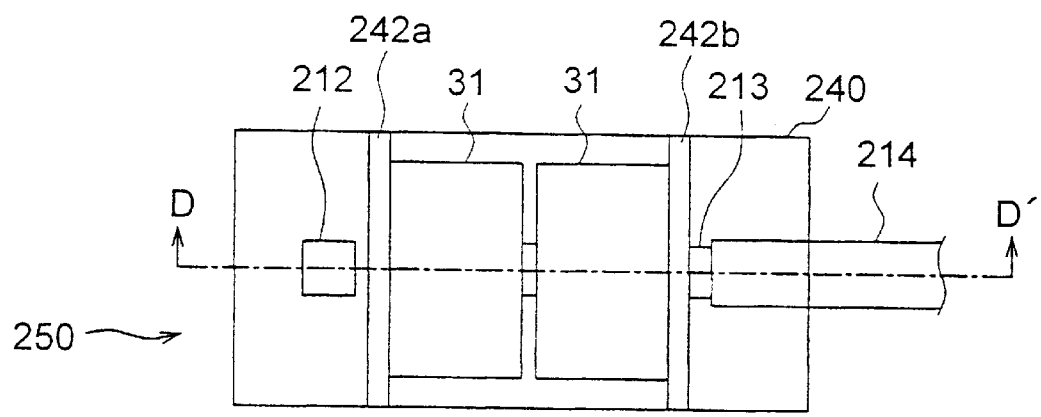
Figure 19B:
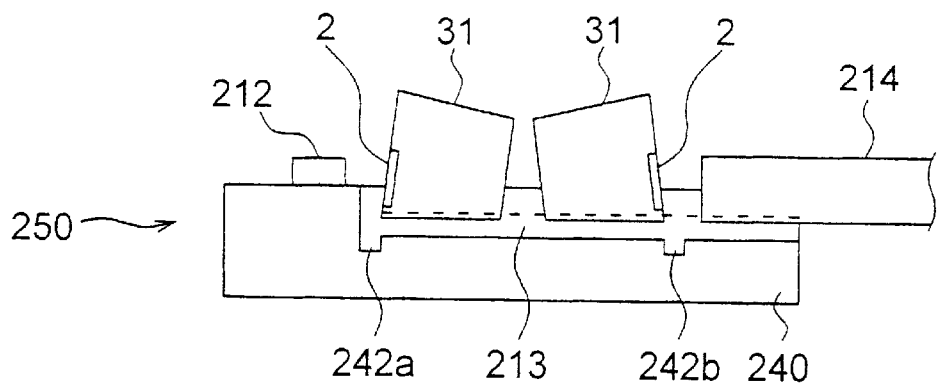

FIGS. 19A and 19B show an example of an optical module 250 using a supporting substrate 240 and a lens element 31. The optical module 250 is made up of a supporting substrate 240, a light source 212 using a laser diode or the like, two lens elements 31, and a optical fiber 214. Each projection portions 9 of two lens elements 31 and the optical fiber 214 are arranged in the groove portion 213 to be accepted in part thereby. The light source 212, two lens elements 31, and the optical fiber 214 are arranged with a predetermined interval and are optically coupled with each other. The lens formation plane of the lens element 31 on the side of the light source 212 is arranged to face to the light source 212 while the lens formation plane of the lens element 31 on the side of the optical fiber 214 is arranged to face the optical fiber 214. The lens element 31 on the side of the light source 212 has the collimating function of converting the divergent light rays into the parallel luminous flux when it receives the divergent light rays from the light source 212. The lens element 31 on the side of the optical fiber 214 has the function of condensing the above parallel luminous flux toward the center portion of the end face of the optical fiber 214. FIG. 19A is a top plan view of the optical module 250 and FIG. 19B is a sectional view taken along a line D–D' of FIG. 19A. A dotted line as shown in FIG. 19B indicates a horizontal position, at which two lens elements 31 and the optical fiber 214 come in contact with the side wall of the groove portion 213.

In the next, there will be explained a method for packaging the optical module 250. At first, the vacuum sucking means seizes the lens element 31 by the upper flat plane 7 of the handling portion 4 of it. Then, the vacuum sucking means carries the lens element 31 to and mounts it on the supporting substrate 240 orienting the lens element 31 in the direction enabling the projection portion 9 of it to come in contact with the groove portion 213. At this time, two lens elements are arranged through the positioning operation referring to a plurality of reference points, that is, the position of the opening portion of the grooves 10a and 10c provided on the lens formation plane and the opposite plane thereof of the lens element 31 as well as the edge of the recesses 242a and 242b provided on the supporting substrate 240, and also by making use of the image processing by means of a CCD camera or the like. After it has been confirmed that two lens elements 31 are suitably placed in the predetermined positions, respectively, a thermosetting resin is uniformly applied to the upper surface of the supporting substrate 240. Then, the supporting substrate is pressed with a predetermined pressure force from its upper side and at the same time, it is heated from its lower side, thereby curing the resin. With this, the lens element 31 is connected with the supporting substrate 240. In the next, the positioning of the light source 212 is carried out with high accuracy by using a marker for instance, in regard to the upper portion of the supporting substrate 240, and then, the light source 212 is connected with the electrode (not shown) on the supporting substrate 240 by means of solder bumps or the like. Finally, the optical fiber 214 is mounted on the groove portion 213 such that the circumferential wall of it comes in contact with the side wall of the groove portion 213 and then, is connected therewith by using a suitable resin or the like.

As described above, in the current embodiment, the positioning of elements forming the optical module is carried out by referring to the grooves 10a and 10c provided on the lens element 31 as well as the recesses 242a and 242b provided on the supporting substrate 240. With this, similar to the eleventh embodiment, even if a lens element has such an external form as the lens element 31, it can be easily mounted with high accuracy of ±1 μm in a short period of time. Furthermore, in case of the eleventh embodiment, if a resin is used for connecting elements forming the optical module with each other, it might happen that the positioning marks are covered by the resin, so that the marks is made unclear. In case of the current embodiment, however, the positioning marks 224 are not used, and the positioning of the elements is carried out by means of the recesses 242a and 242b, instead. Consequently, even if the resin is used, there is no chance that things capable of being a reference point, mark, or the like is made unclear by the resin. In the above example, two recesses 242a and 242b are provided for use in the positioning. However, the number of recesses may be one or three or more if necessary.

In the explanation of the eleventh and twelfth embodiments, the method for packaging the optical module is explained by way of an example using the lens element 31. However, the invention is not limited by this example. If a lens element is provided with a groove equivalent to the positioning groove of the lens element 31, the package method as described above is applicable with high accuracy to the package of the optical module using a lens element having a different external form from that of the lens element 31. For instance, the package method is applicable to the optical module using a lens element of which the height H is kept constant from the lens formation plane side through the opposite plane side thereof or a lens element of which the external form as seen when seeing it in the direction of its width w, shows the other form than a trapezoid.

In the optical module according to the eleventh and twelfth embodiments, the light source 212 is used, but it is possible to use a light receiving element like a photodiode instead of the light source.

Next, an example of a prior art package method will be described with reference to FIGS. 20A, 20B, 21A and 21B in order to compare it with the package method according to the invention. In the prior art package method, the positioning of each element forming an optical module is carried out by using the upper side of the lens formation plane as a reference point. According to this method, however, it sometimes occurs that an error is caused depending on the external form of the lens element. FIGS. 20A and 20B are side views showing the external forms of two kinds of lens elements 1a and 1b as obtained when seeing them from their sides, respectively. In the lens elements 1a and 1b as shown in FIGS. 20A and 20B, each of lens portions 2 is equally formed on the left surface of the plane vertical to the drawing paper. The plane, on which the lens portion 2 is formed, is called the lens formation plane. Each lens formation plane of lens elements 1a and 1b equally has a circular form. However, lens elements 1a and 1b are different from each other with regard to their plane external forms as obtained when taking a side view of them. The plane forms of the lens elements 1a and 1b on a plane approximately perpendicular to the lens formation plane are different from each other, and this difference comes out as difference of upper and lower edge lines as shown in the above figures.

The lens element 1a as shown in FIG. 20A is formed in the shape of a cylinder, and the lens portion 2 is formed on one flat plane (lens formation plane) of the lens element 1a. On one hand, two lines (not existing actually) indicated as the upper and lower edge lines 14a and 16a on the outer circumferential plane (side plane of the cylinder) meet at right angles with the lens formation plane. The lens element 1b as shown in FIG. 20B is formed in the shape of a trapezoid, and the lens portion 2 is formed on one flat plane (lens formation plane) of the lens element 1b. On one hand, two lines (not existing actually) indicated as the upper and lower edge lines 14b and 16b on the outer circumferential plane (side plane of the frustum) do not meet at right angles with the lens formation plane. The diameter of the lens element 1b is gradually reduced as it goes on from the lens formation plane toward the opposite plane thereof, and the plane external form of the lens element 1b is in the shape of trapezoid when taking a side view of it.

FIGS. 21A and 21B are cross sectional views showing respective cases where lens elements 1a and 1b are mounted to couple them with respective light sources 212 like a laser diode or the like by using the prior art package method. In FIGS. 21A and 21B, lens elements 1a and 1b are mounted on the corresponding groove portions 263 formed on the supporting substrates to come in contact therewith. Also, in FIGS. 21A and 21B, a line 233 indicates the optical axis of the laser diode.

As edge lines 14a and 16a on the side plane of the lens element 1a meet at right angles with the lens formation plane, the lens element 1a can be arranged in a desired position as shown in FIG. 21A. On one hand, the edge line 16b on the side plane of the lens element 1b does not meet at right angles with the lens formation plane, so that if the lens element 1b is mounted on the groove portion 263 to come in contact therewith, the lens formation plane comes to slant from the plane vertical to the groove portion 236 as shown in FIG. 21B. At this time, if the lens element 1b is arranged by using the upper side of the lens formation plane as a reference point, the lens element 1b is arranged to be off the desired position as shown by two arrow marks facing to each other in FIG. 21B. This results in a distance error in the direction of the optical axis.

As described above, according to the prior art mounting method, the mounting error is caused depending on the external form of the lens elements. Especially, in case of the lens element of which the side plane is formed by etching or the like, it occurs that the side plane of the lens element has a little angle with the direction vertical to the lens formation plane. It also occurs that a designed angle between the side plane and the lens formation plane of the lens element is not realized for some reasons in the manufacturing process. In these cases, the distance error in the direction of the optical axis is caused with the slant of the lens element. In some optical system, the distance error in the direction of the optical axis has a larger influence than the slant of the lens element, which becomes a significant cause for reducing the efficiency of the optical coupling between the lens element and the laser diode, optical fiber, and so forth.

In the explanation of the prior art mounting method, there are used the lens elements of the cylinder type and of the frustum type as well. However, even if the lens element as shown in FIG. 1 is mounted by means of the prior art mounting method, the similar error would never fail to be caused.

In the above embodiments, the form of the lens portion, edge portion, projection portion, handling portion, handling/supporting portion, connecting portion, nick, frame, groove, groove portion, positioning mark, recess portion, and so forth is not limited to the form as described in the above various examples, and various form may be considered. For instance, the form of the lens portion is not limited to the circular form and may be formed in a desired form, and the lens portion may be a lens portion of the refraction type. The form of the cross section of the nick is not limited to the V-shape and it may be a U-shape, a rectangular shape, or other shape. The form of the cross section of the groove, groove portion, and recess portion is not limited to the form as described in the above various examples and it may be either one of an approximately square shape, an approximately V-shape, an approximately trapezoid shape, an approximately semicircular shape and an approximately rectangular shape, or other shapes.

Furthermore, the luminous flux converting portion is explained in terms of "lens portion" as a mere example of it. Also, terms of "lens element" are used merely for expressing an example of various optical members constituting an optical system. Accordingly, the invention should not be limited by these terms. For instance, the invention is applicable to the case where the luminous flux converting portion is replaced by an optical deflective portion while the optical member is replaced by an optical deflective element.

According to the invention as described in detail in the above, there are provided an optical member, a method for manufacturing the same, and an optical module including the optical member, the optical member being handled with ease and the luminous flux converting portion of it being protected from damage and contamination which would be given by and come from the outside. The optical member can be easily and stably caught and held by a vacuum sucking means. Furthermore, according to another aspect of the invention, there are provided an optical member which can be mounted with high accuracy and with ease as well, a method for mounting the same, and an optical module including the optical member as packaged therein with high accuracy and with ease as well.

While preferred embodiments of the invention have been shown and described in the above with reference to the accompanying drawings, it is needless to say that the invention is not limited by such examples. It will be apparent to those skilled in the art that various changes and modifications can be made within the category of technical thoughts as recited in the scope of claim for patent, and it is understood that those changes and modifications naturally belong to the technical category of the invention.

What is claimed is:

1. An optical member comprising:
   a luminous flux conversion portion formed on the surface of an optical substrate;
   an edge portion formed along a part of the circumference of said luminous flux conversion portion; and
   a handling portion which is provided on the side of the other part of the circumference of said luminous flux conversion portion approximately in a plane approximately in parallel with the surface of said luminous flux conversion portion, and is extended with a width wider than said luminous flux portion.

2. An optical member as claimed in claim 1, wherein said handling portion has a form extending straightforward and is integrated with said edge portion at an approximately middle point between both ends thereof.

3. An optical member as claimed in claim 1, wherein said handling portion takes the form of an approximately rectangular parallelepiped, said edge portion takes the form of an approximately circular arc, and said circular arc form extends from formation plane side of said luminous flux conversion portion to the opposite plane side thereof, thereby forming a projection portion of the semi-cylindrical type.

4. An optical member as claimed in claim 1, wherein said handling portion has a flat plane.

5. An optical member as claimed in claim 4, wherein said handling portion has a form extending straightforward, and said flat plane is a plane existing along the direction toward which said handling portion extends, and is approximately vertical to the surface of said luminous flux conversion portion.

6. An optical member as claimed in claim 1, wherein said handling portion is asymmetrically formed with respect to a virtual plane which includes the optical axis of said luminous flux conversion portion and goes across said handling portion, in order to identify either one of both surfaces of said optical substrate.

7. An optical member as claimed in claim 1, wherein said handling portion includes a guide mark for identifying either of both surfaces of said optical substrate.

8. An optical member as claimed in claim 1, wherein said optical member is an optical member to be mounted on a supporting substrate, said optical member being provided with a positioning mark formed on the plane which is approximately vertical to the surface of said luminous flux conversion portion in said handling portion and approaches said supporting substrate at the time of mounting said optical member.

9. An optical member as claimed in claim 8, wherein said positioning mark takes the form of a groove, of which the cross section has one of the shapes of an approximately V-shape, an approximately trapezoid shape, an approximately semicircular shape, an approximately rectangle shape, and an approximately square shape.

10. An optical member as claimed in claim 8, wherein said positioning mark is asymmetrically formed with respect to a virtual plane which includes the optical axis of said luminous flux conversion portion and goes across said handling portion, in order to identify either one of both surfaces of said optical substrate.

11. An optical member as claimed in claim 1 wherein, said optical member is an optical member which is arranged on a groove portion as formed on said supporting substrate for use in arrangement of optical members, such that it opposes to the end face of an optical fiber placed on said groove portion and achieves an optical coupling with said optical fiber,
   said edge portion has a circular arc form, which extends from said luminous flux conversion portion formation plane side to the opposite plane side thereof, and the outer diameter of said circular arc shape is made approximately equal to that of said optical fiber.

12. An optical member as claimed in claim 1, wherein said optical substrate is a silicon crystalline substrate.

13. An optical member as claimed in claim 1, wherein said luminous flux conversion portion is made up of diffractive optical elements.

14. An optical member as claimed in claim 1, wherein said luminous flux conversion portion is a lens.

15. An optical member comprising:
   a plurality of luminous flux conversion portions formed on the surface of an optical substrate;
   edge portions formed along a part of respective circumferences of a plurality of said luminous flux conversion portions; and
   a handling/supporting portion which is provided on the side of the other part of respective circumferences of a plurality of said luminous flux conversion portions and is extended in a plane approximately in parallel with the surface of said luminous flux conversion portions, and connects and supports a plurality of said luminous flux conversion portions together.

16. An optical member as claimed in claim 15, wherein a plurality of said luminous flux portions are formed in the shape of an array, and said handling/supporting portion has a form extending along the longitudinal direction of said array.

17. An optical member as claimed in claim 15, wherein said optical substrate is a silicon crystalline substrate.

18. An optical member as claimed in claim 15, wherein said luminous flux conversion portion is made up of diffractive optical elements.

19. An optical member as claimed in claim 15, wherein said luminous flux conversion portion is a lens.

* * * * *